(12) United States Patent
Nagahara et al.

(10) Patent No.: US 9,664,884 B2
(45) Date of Patent: May 30, 2017

(54) PROJECTION ZOOM LENS AND PROJECTION TYPE DISPLAY DEVICE

(71) Applicant: FUJIFILM Corporation, Tokyo (JP)

(72) Inventors: Akiko Nagahara, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/824,473

(22) Filed: Aug. 12, 2015

(65) Prior Publication Data
US 2016/0062088 A1 Mar. 3, 2016

(30) Foreign Application Priority Data

Aug. 29, 2014 (JP) .................................. 2014-175045

(51) Int. Cl.
| | | |
|---|---|---|
| *G02B 13/16* | (2006.01) | |
| *G02B 13/04* | (2006.01) | |
| *G02B 15/177* | (2006.01) | |
| *G02B 15/14* | (2006.01) | |
| *G02B 15/163* | (2006.01) | |
| *G02B 15/24* | (2006.01) | |

(52) U.S. Cl.
CPC ............. *G02B 13/16* (2013.01); *G02B 13/04* (2013.01); *G02B 15/14* (2013.01); *G02B 15/163* (2013.01); *G02B 15/177* (2013.01); *G02B 15/24* (2013.01)

(58) Field of Classification Search
CPC ...... G02B 13/16; G02B 15/177; G02B 13/04; G02B 13/0045; G02B 13/009; G02B 15/14; G02B 15/163; G02B 15/22; G02B 15/24

USPC .................... 359/649, 676, 680–681, 683
See application file for complete search history.

(56) References Cited

U.S. PATENT DOCUMENTS

| | | | | |
|---|---|---|---|---|
| 5,559,636 A | * | 9/1996 | Ito ....................... | G02B 15/167 359/689 |
| 2008/0074756 A1 | | 3/2008 | Yamamoto | |
| 2011/0157716 A1 | * | 6/2011 | Nagatoshi ............ | G02B 15/177 359/682 |
| 2014/0254027 A1 | * | 9/2014 | Amano .................. | G02B 13/18 359/683 |
| 2016/0062093 A1 | * | 3/2016 | Nagahara ............. | G02B 15/177 359/680 |

FOREIGN PATENT DOCUMENTS

JP 2008-083229 4/2008

\* cited by examiner

*Primary Examiner* — Jordan Schwartz
(74) *Attorney, Agent, or Firm* — Youn & Thompson

(57) ABSTRACT

A projection zoom lens is essentially constituted by, in order from the magnification side: a negative first lens group; a positive second lens group; a third lens group; a positive fourth lens group; a fifth lens group; and a positive sixth lens group. The distance between the first and second lens groups is shorter, the distance between the second and third lens groups is longer, the distance between the third and fourth lens groups is shorter, the distance between the fourth and the fifth lens groups is longer, and the distance between the fifth and sixth lens groups is longer at the telephoto end than at the wide angle end. A lens having a negative refractive power in the paraxial region is provided most toward the magnification side in the first lens group. The fifth lens group has a negative lens.

19 Claims, 17 Drawing Sheets

FIG.1
EXAMPLE 1
WIDE
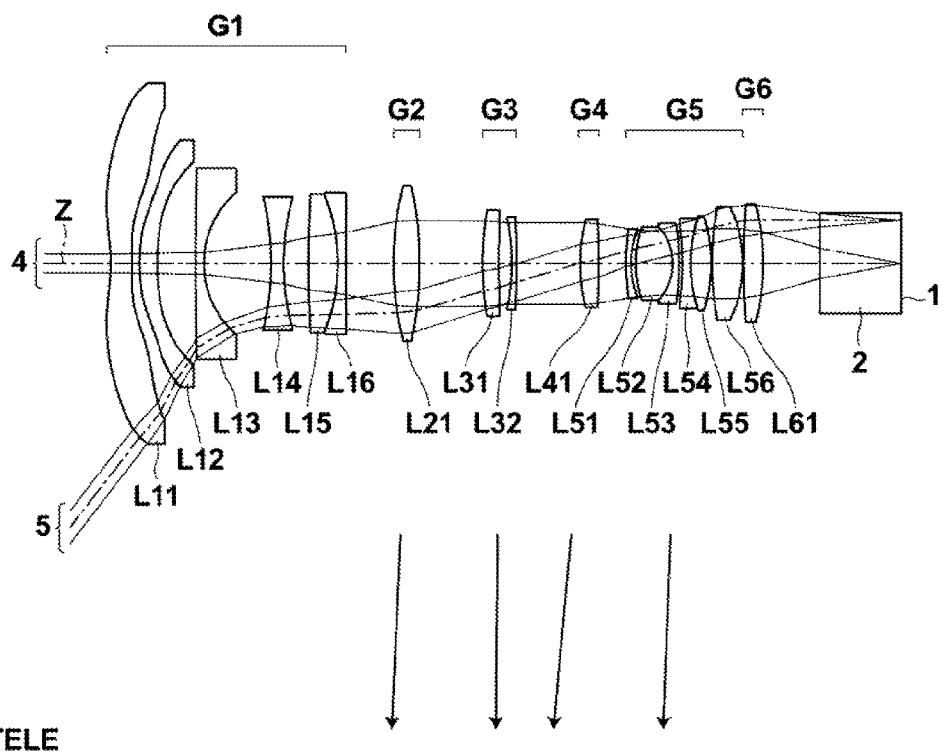
TELE
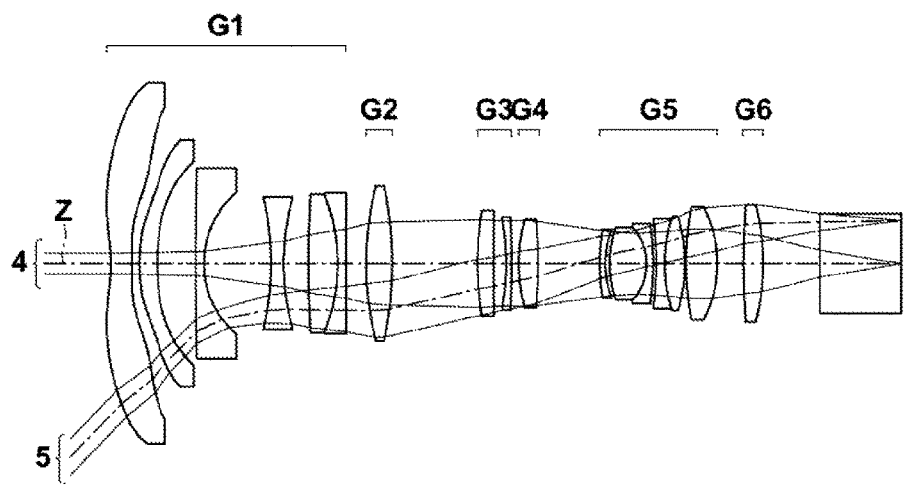

FIG.2
EXAMPLE 2
WIDE
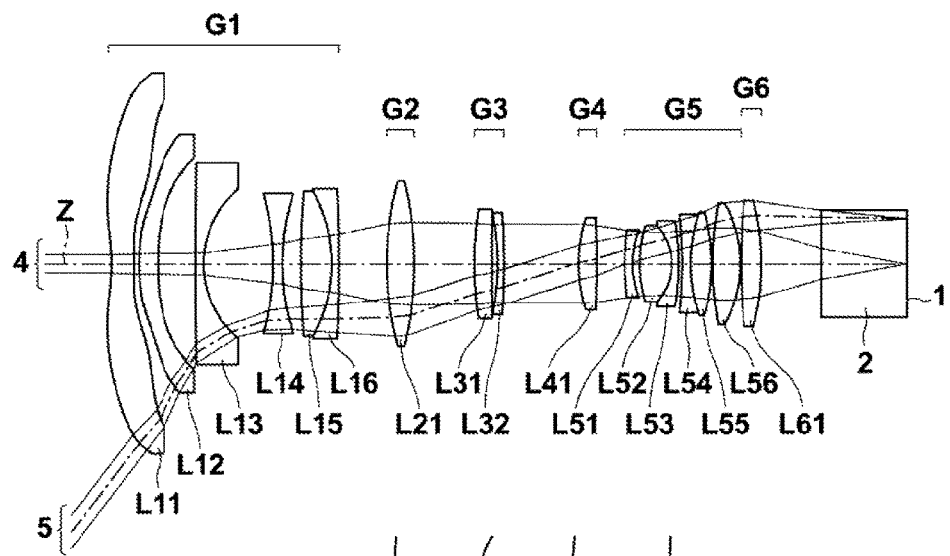
TELE
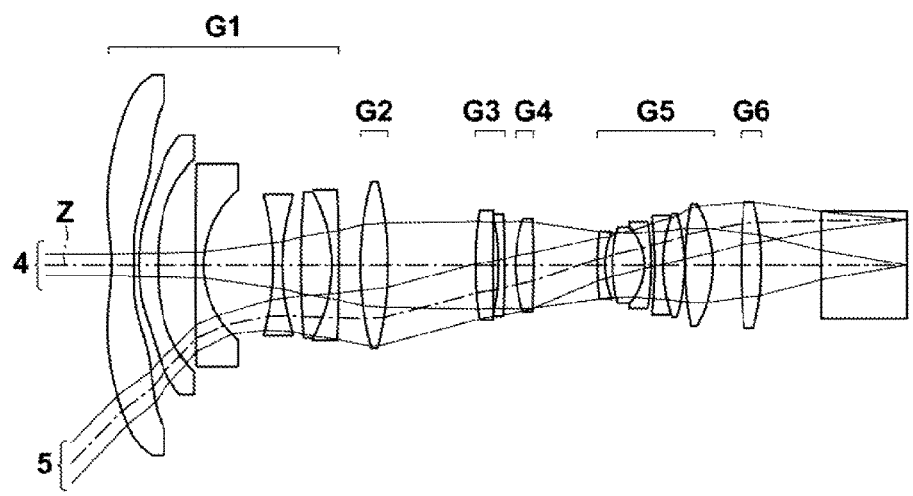

FIG.3
EXAMPLE 3
WIDE
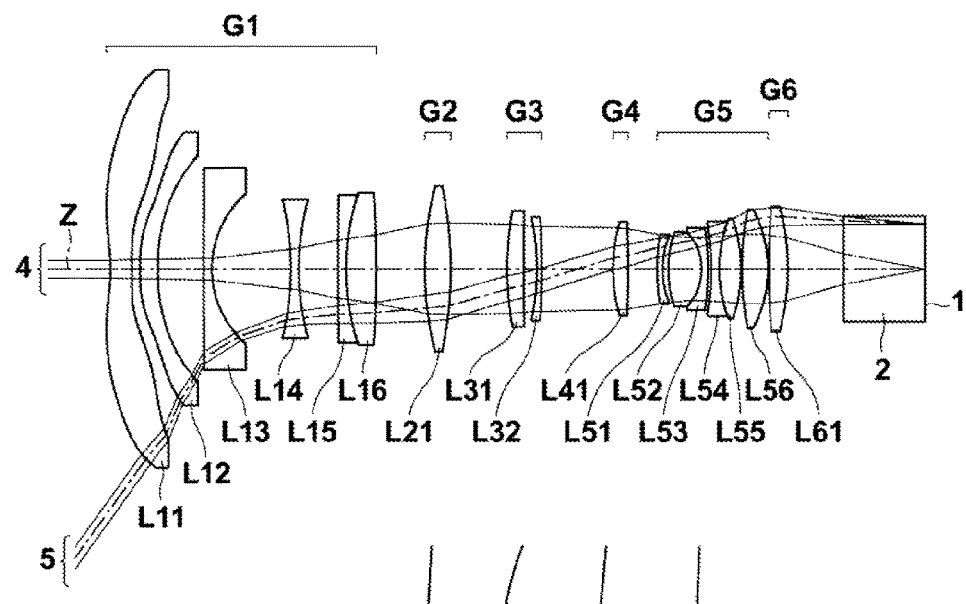
TELE
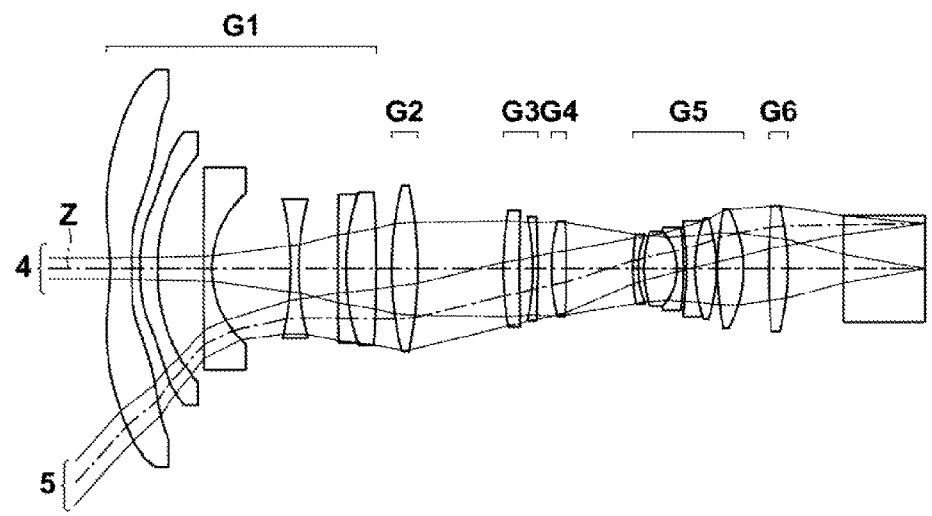

FIG.4
EXAMPLE 4
WIDE
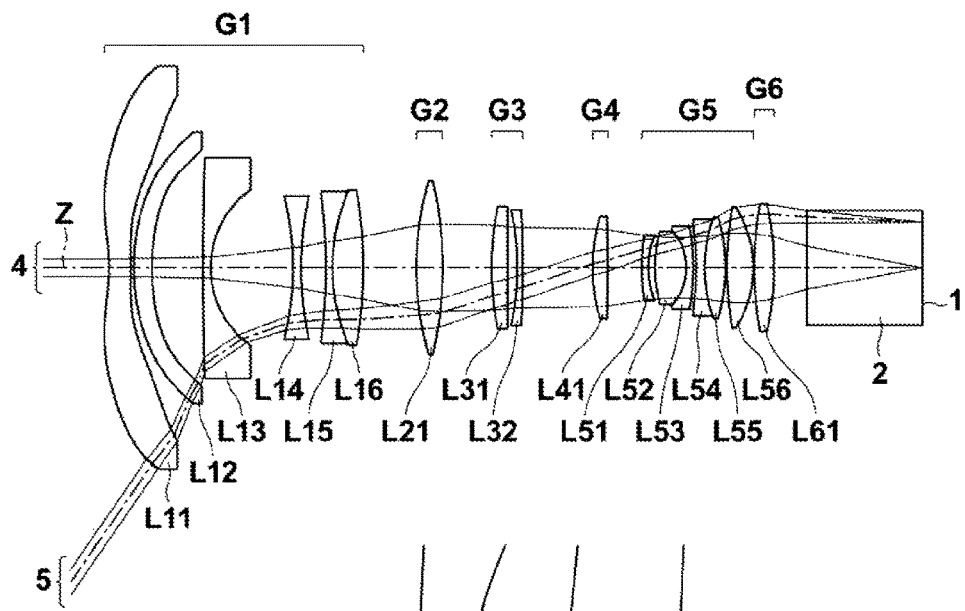
TELE
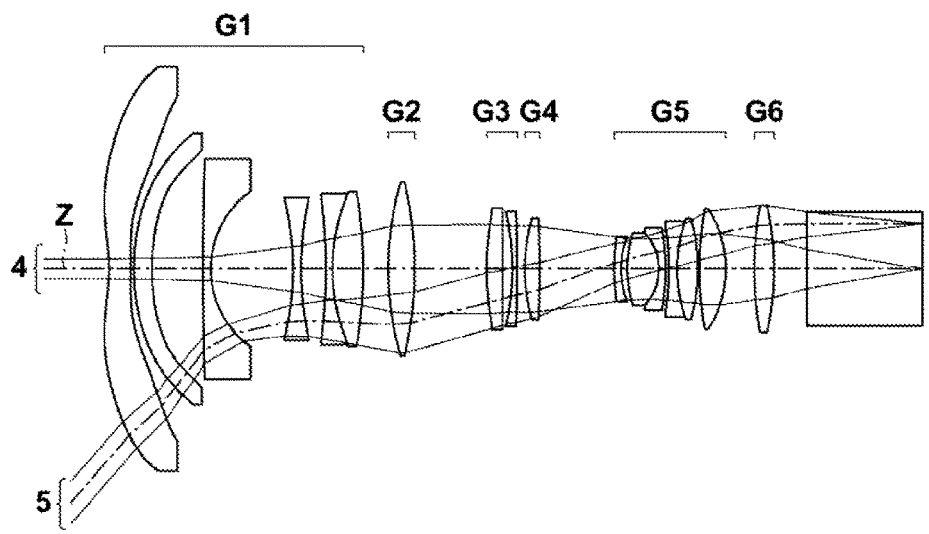

FIG.5
EXAMPLE 5
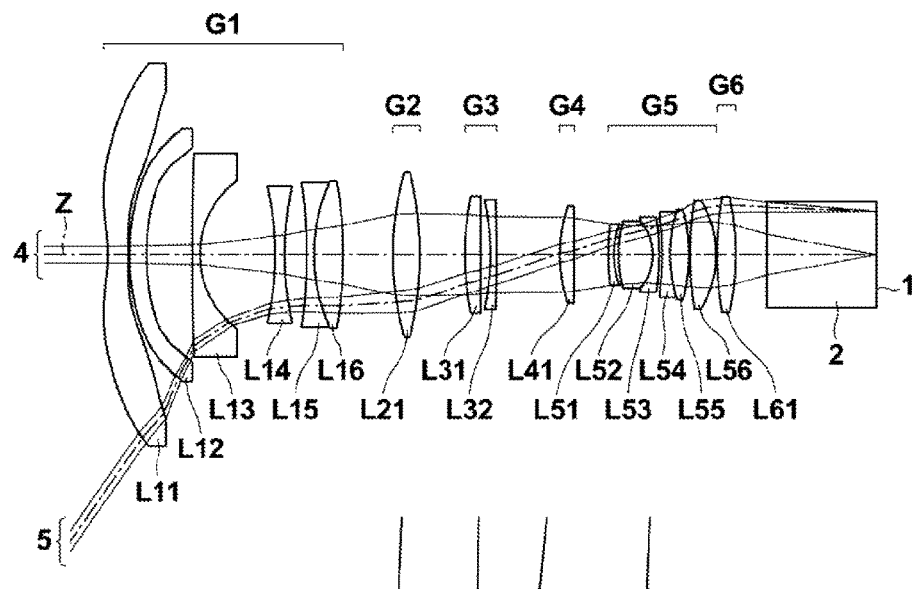
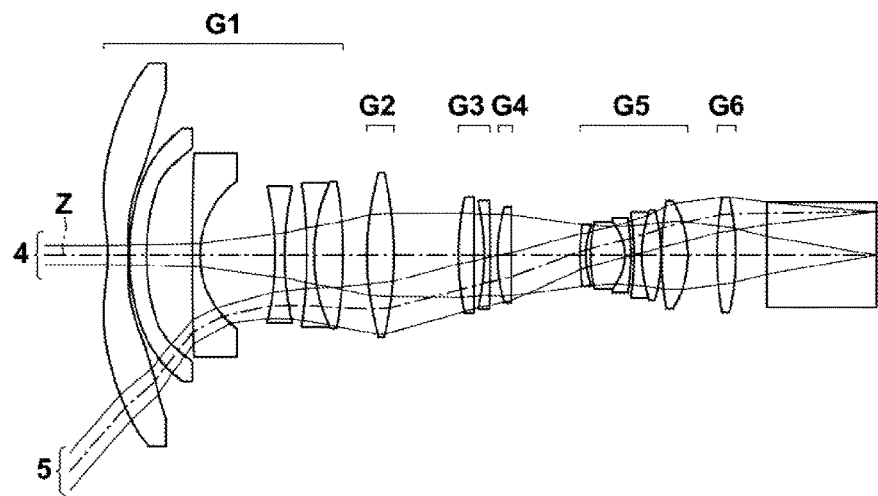

FIG.6
EXAMPLE 6
WIDE
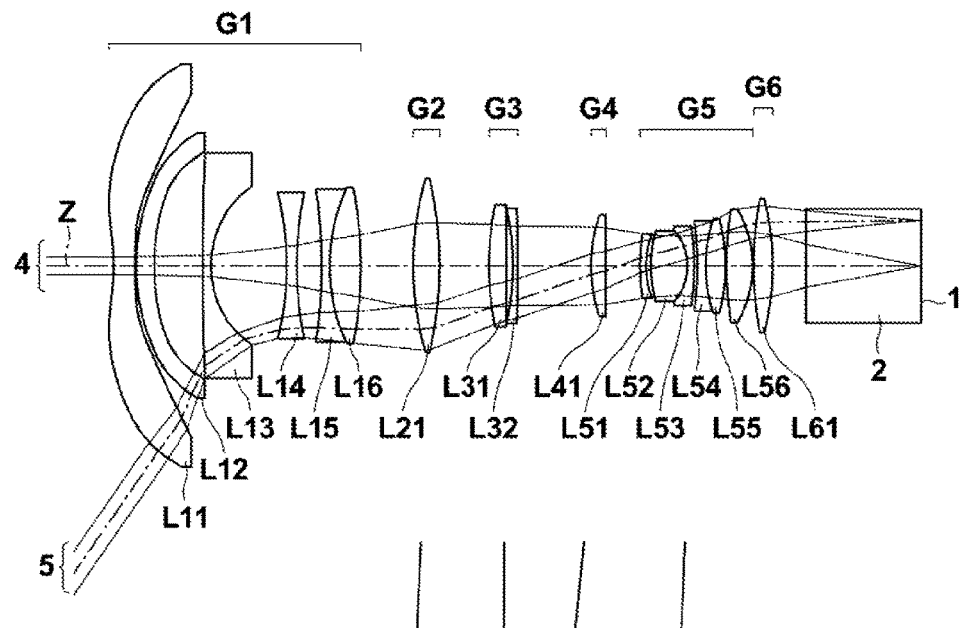
TELE
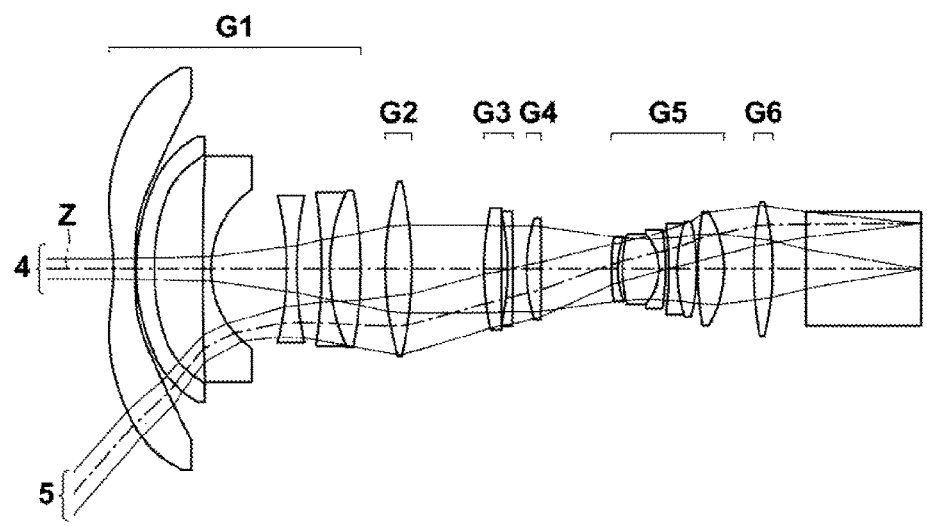

FIG.7
EXAMPLE 7
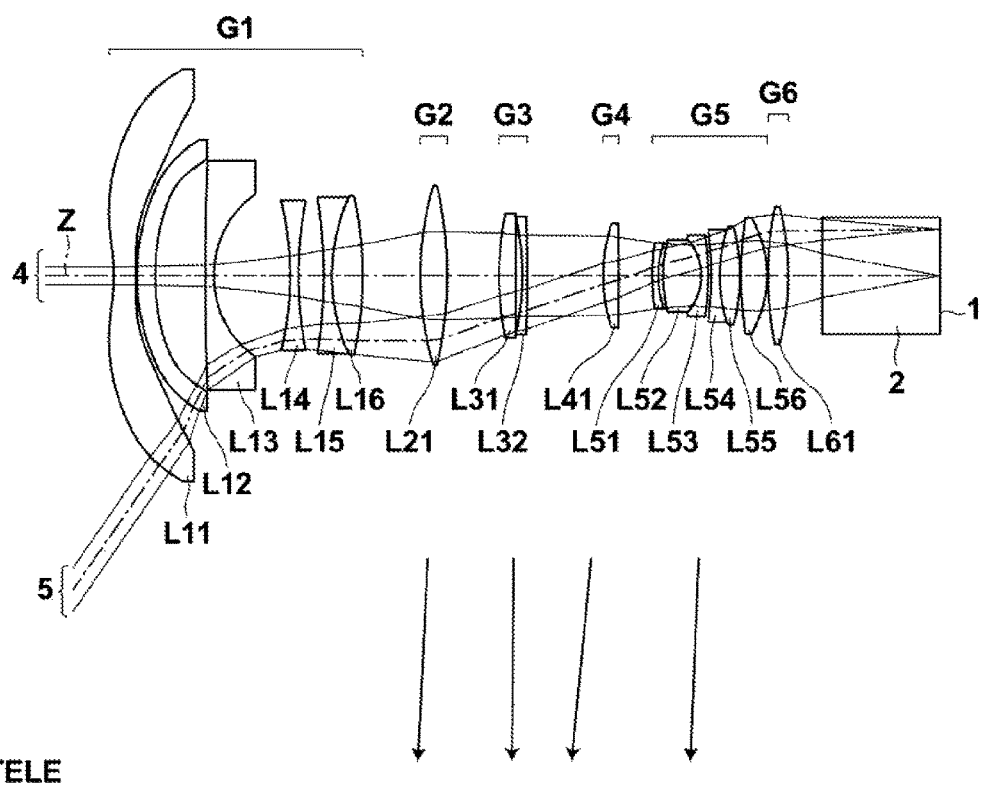
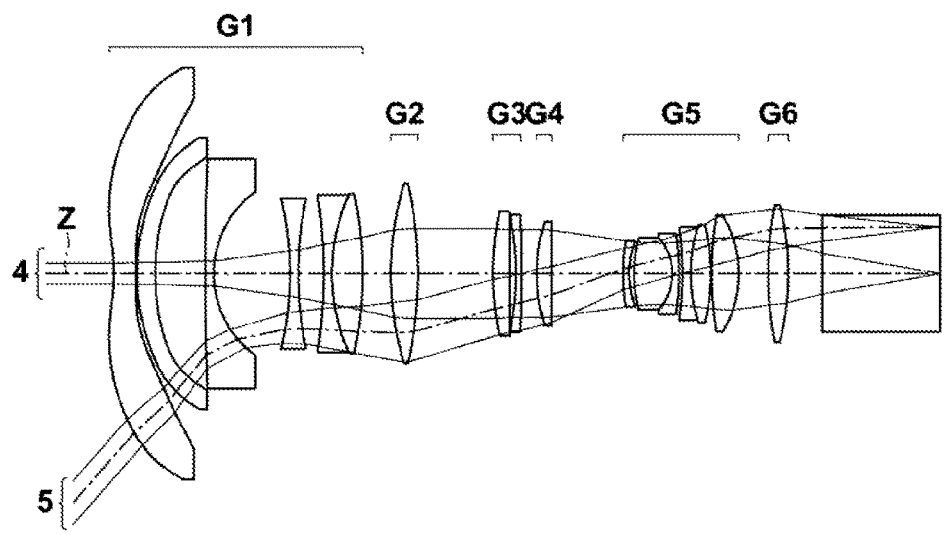

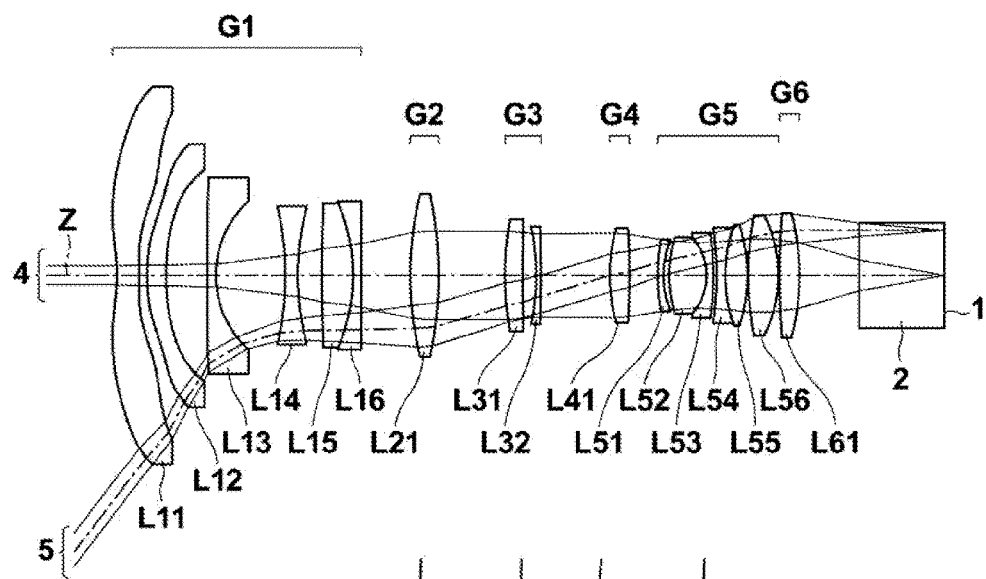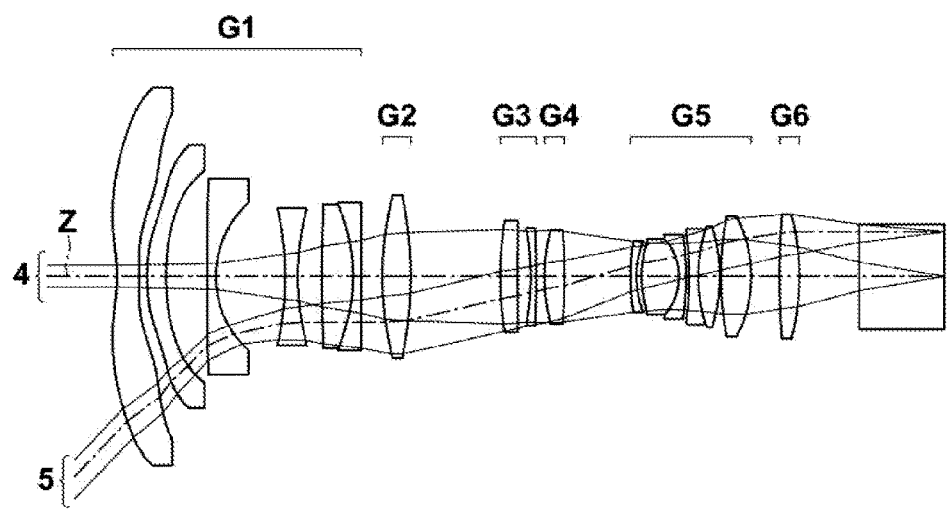

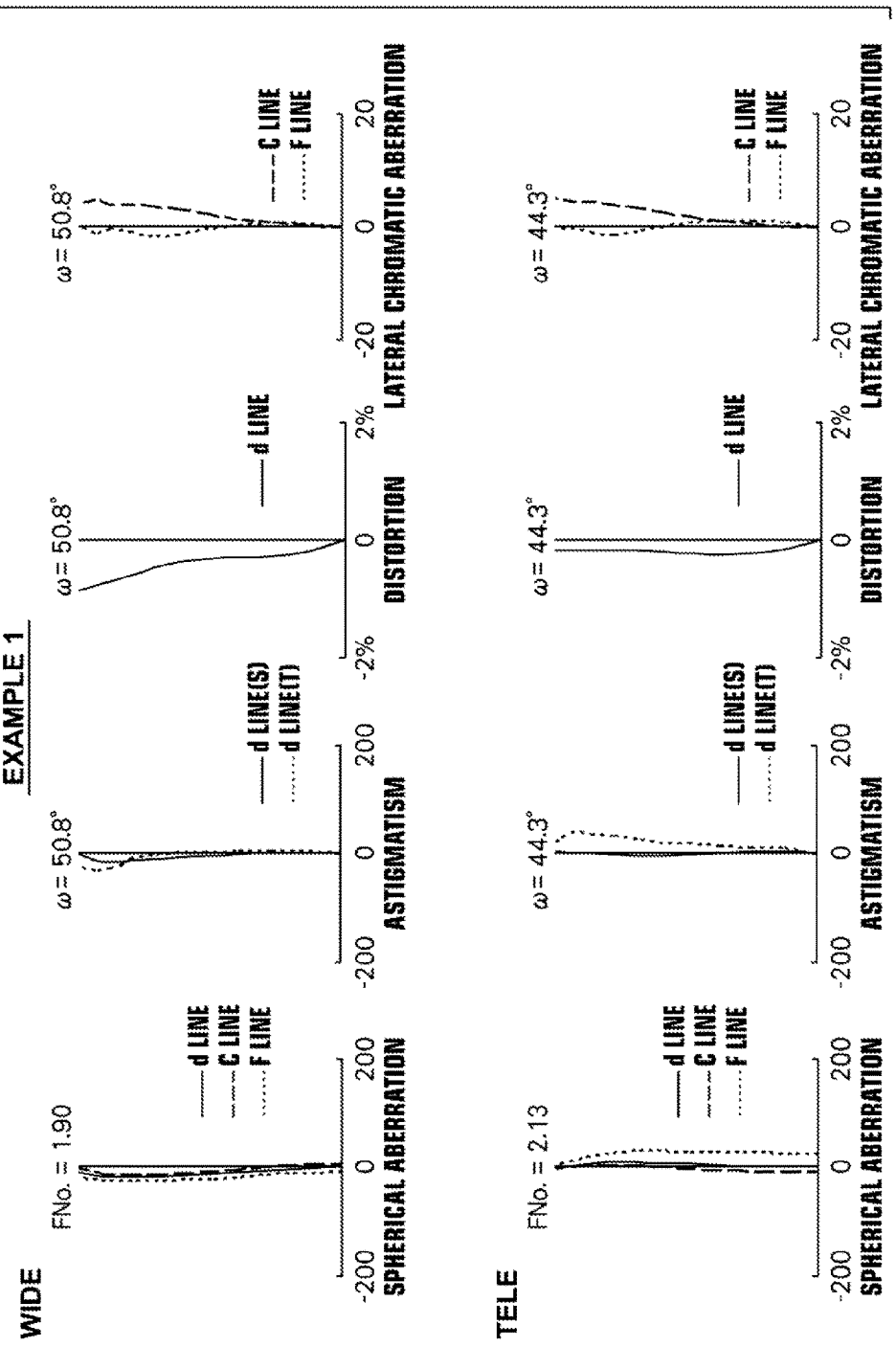

PROJECTION ZOOM LENS AND PROJECTION TYPE DISPLAY DEVICE

CROSS REFERENCE TO RELATED APPLICATIONS

The present application claims priority under 35 USC §119 to Japanese Patent Application No. 2014-175045 filed on Aug. 29, 2014. The above application is hereby expressly incorporated by reference in its entirety, into the present application.

BACKGROUND

The present disclosure is related to a projection zoom lens and a projection type display device, for example, to a projection zoom lens that can be favorably used for magnified projection of beams that bear video information from a light valve onto a screen, and to a projection type display device employing such a projection zoom lens.

Conventionally, projection type display devices that magnify and project images displayed on a light valve, such as liquid crystal display elements, are in wide use. In optical systems that utilize transmissive liquid crystal display elements as light valves, cross dichroic prisms are generally employed to combine colors. In order to improve color combining properties taking the angular dependency of the cross dichroic prisms into consideration, it is desired for projection lenses to be employed in such optical systems to be configured to be telecentric at the reduction side. In addition, there is a tendency for zoom lenses which are capable of changing magnification to be preferred as projection lenses, such that image sizes which are projected according to screen sizes can be adjusted even in cases that the degree of freedom of installation conditions is low.

A known projection zoom lens which is configured to be telecentric at the reduction side is disclosed in Japanese Unexamined Patent Publication No. 2008-083229. Japanese Unexamined Patent Publication No. 2008-083229 discloses a zoom lens constituted by six lens groups, in which a negative meniscus lens having a convex surface toward the magnification side is provided most toward the magnification side.

SUMMARY

In cases that a projection type display device is to be employed for a presentation, there are often cases in which a large image size is desired within a space having a comparatively short depth and a short projection distance. In addition, in cases that a projection type display device is employed for use in a home theater system or the like, there is great demand to view video on a large screen. Due to these circumstances, there is demand for a projection zoom lens having a wider angle of view, in order to enable projection of images onto larger screens with shorter projection distances.

However, the angle of view of the lens system disclosed in Japanese Unexamined Patent Publication No. 2008-083229 is insufficient to meet the recent demand for wider angles of view, and a further widening of the angle of view is desired.

Meanwhile, the number of pixels of light valves is increasing recently, and therefore there is demand for high resolution projection lenses which are compatible with such increases in the number of pixels.

The present disclosure has been developed in view of the foregoing circumstances. The present disclosure provides a projection zoom lens having high optical performance to be compatible with the recent increases in the number of pixels while having a wide angle of view. The present disclosure also provides a projection type display device equipped with such a projection zoom lens.

A first projection zoom lens of the present disclosure essentially consists of, in order from the magnification side to the reduction side:
a first lens group having a negative refractive power;
a second lens group having a positive refractive power;
a third lens group;
a fourth lens group having a positive refractive power;
a fifth lens group; and
a sixth lens group having a positive refractive power;
the distances among all adjacent lens groups changing when changing magnification;
the distance between the first lens group and the second lens group being shorter at the telephoto end than at the wide angle end;
the distance between the second lens group and the third lens group being longer at the telephoto end than at the wide angle end;
the distance between the third lens group and the fourth lens group being shorter at the telephoto end than at the wide angle end;
the distance between the fourth lens group and the fifth lens group being longer at the telephoto end than at the wide angle end;
the distance between the fifth lens group and the sixth lens group being longer at the telephoto end than at the wide angle end;
a lens having a concave surface toward the magnification side in the paraxial region and a negative refractive power in the paraxial region being provided most toward the magnification side in the first lens group; and
the fifth lens group having at least one negative lens.

A second projection zoom lens of the present disclosure essentially consists of, in order from the magnification side to the reduction side:
a first lens group having a negative refractive power;
a second lens group having a positive refractive power;
a third lens group;
a fourth lens group having a positive refractive power;
a fifth lens group; and
a sixth lens group having a positive refractive power;
the distances among all adjacent lens groups changing when changing magnification;
the distance between the first lens group and the second lens group being shorter at the telephoto end than at the wide angle end;
the distance between the second lens group and the third lens group being longer at the telephoto end than at the wide angle end;
the distance between the third lens group and the fourth lens group being shorter at the telephoto end than at the wide angle end;
the distance between the fourth lens group and the fifth lens group being longer at the telephoto end than at the wide angle end;
the distance between the fifth lens group and the sixth lens group being longer at the telephoto end than at the wide angle end;
a lens having a negative refractive power in the paraxial region being provided most toward the magnification side in the first lens group;

the first lens group having at least one positive lens; and the fifth lens group having at least one negative lens.

Preferred configurations for the first and second projection zoom lenses of the present disclosure to have will be listed below.

In the projection zoom lens of the present disclosure, it is preferable for one or arbitrary combinations of Conditional Formulae (1) through (6) and Conditional Formulae (1-1) through (6-1) below to be satisfied. With respect to Conditional Formulae (5) and (5-1), it is preferable for these conditional formulae to be satisfied in the case that the fifth lens group has at least one positive lens.

$$-0.2 < fw/f12w < 0.3 \tag{1}$$

$$-0.1 < fw/f12w < 0.2 \tag{1-1}$$

$$-0.2 < fw/f3 < 0.2 \tag{2}$$

$$-0.1 < fw/f3 < 0.1 \tag{2-1}$$

$$0 < fw/f5 < 0.2 \tag{3}$$

$$0.04 < fw/f5 < 0.1 \tag{3-1}$$

$$35 < G5Nvd < 55 \tag{4}$$

$$40 < G5Nvd < 50 \tag{4-1}$$

$$62 < G5Pvd \tag{5}$$

$$70 < G5Pvd \tag{5-1}$$

$$-1.2 < fw/f1 < -0.3 \tag{6}$$

$$-1.0 < fw/f1 < -0.4 \tag{6-1}$$

wherein fw is the focal length of the entire projection zoom lens at the wide angle end, f1 is the focal length of the first lens group, f3 is the focal length of the third lens group, f5 is the focal length of the fifth lens group, f12w is the combined focal length of the first lens group and the second lens group at the wide angle end, G5Nvd is the average Abbe's number of negative lenses that constitute the fifth lens group with respect to the d line, and G5Pvd is the average Abbe's number of positive lenses that constitute the fifth lens group with respect to the d line.

In addition, in the projection zoom lens of the present disclosure, it is preferable for the lens surface most toward the magnification side within the first lens group to be of an aspherical shape having a concave surface toward the magnification side in the paraxial region, a region at which the negative refractive power becomes weaker than that in the paraxial region toward the exterior of the paraxial region in the radial direction, and an inflection point within the effective diameter thereof.

In addition, in the projection zoom lens of the present disclosure, it is preferable for the second lens group to essentially consist of only a single biconvex lens, and for Conditional Formula (7) below to be satisfied.

$$40 < G2vd < 50 \tag{7}$$

wherein G2vd is the Abbe's number of the biconvex lens that constitutes the second lens group with respect to the d line.

In the projection zoom lens of the present disclosure, it is preferable for the first lens group to essentially consist of, in order from the magnification side to the reduction side, a negative lens having a concave surface toward the magnification side, a lens having a convex surface toward the magnification side, a negative lens having a concave surface toward the reduction side, a biconcave lens, and a cemented lens formed by cementing a positive lens and a negative lens together.

In addition, in the projection zoom lens of the present disclosure, it is preferable for the third lens group to essentially consist of, in order from the magnification side to the reduction side, a positive lens having a convex surface toward the magnification side and a negative lens having a concave surface toward the magnification side.

A projection type display device of the present disclosure comprises:
a light source;
a light valve, into which light from the light source enters; and
the projection zoom lens of the present disclosure that projects optical images formed by light modulated by the light valve onto a screen.

Note that the "magnification side" refers to the side toward which optical images are projected (the side toward a screen). For the sake of convenience, the side toward the screen will be referred to as the magnification side even in cases that optical images are reduced and projected. Meanwhile, the "reduction side" refers to a side toward an original image display region (the side toward a light valve). For the sake of convenience, the side toward the light valve will be referred to as the reduction side even in cases that images are reduced and projected.

Note that the expression "essentially consist(s) of" means that the projection zoom lens may include: lenses without any practical refractive power; and optical elements other than lenses such as stops and a cover glass, in addition to the constituent elements which are listed above.

Note that a "lens group" is not necessarily constituted by a plurality of lenses, and may be constituted by a single lens.

Note that the signs of the refractive powers of the lens groups, the signs of the refractive powers of the lenses, and the surface shapes of the lenses will be considered as being those in the paraxial region for those that include aspherical surfaces, unless otherwise noted.

According to the present disclosure, the arrangements of powers, distances among the lens groups when changing magnification, and the configurations of the first and fifth lens groups are favorably set in a zoom lens system having a six lens group configuration. Therefore, a projection zoom lens having a wide angle of view and high optical performance which is compatible with the recent increases in the number of pixels can be realized. In addition, a projection type display device equipped with this projection zoom lens can also be realized.

BRIEF DESCRIPTION OF THE DRAWINGS

FIG. 1 is a collection of sectional diagrams that illustrate the lens configuration of and trajectories of rays of light through a projection zoom lens according to Example 1 of the present disclosure.

FIG. 2 is a collection of sectional diagrams that illustrate the lens configuration of and trajectories of rays of light through a projection zoom lens according to Example 2 of the present disclosure.

FIG. 3 is a collection of sectional diagrams that illustrate the lens configuration of and trajectories of rays of light through a projection zoom lens according to Example 3 of the present disclosure.

FIG. 4 is a collection of sectional diagrams that illustrate the lens configuration of and trajectories of rays of light through a projection zoom lens according to Example 4 of the present disclosure.

FIG. 5 is a collection of sectional diagrams that illustrate the lens configuration of and trajectories of rays of light through a projection zoom lens according to Example 5 of the present disclosure.

FIG. 6 is a collection of sectional diagrams that illustrate the lens configuration of and trajectories of rays of light through a projection zoom lens according to Example 6 of the present disclosure.

FIG. 7 is a collection of sectional diagrams that illustrate the lens configuration of and trajectories of rays of light through a projection zoom lens according to Example 7 of the present disclosure.

FIG. 8 is a collection of sectional diagrams that illustrate the lens configuration of and trajectories of rays of light through a projection zoom lens according to Example 8 of the present disclosure.

FIG. 9 is a collection of diagrams that illustrate aberrations of the projection zoom lens according to Example 1, the diagrams illustrating spherical aberration, astigmatism, distortion, and lateral chromatic aberrations in this order from the left side of the drawing sheet.

BEST MODE FOR CARRYING OUT THE DISCLOSURE

Figure 10:
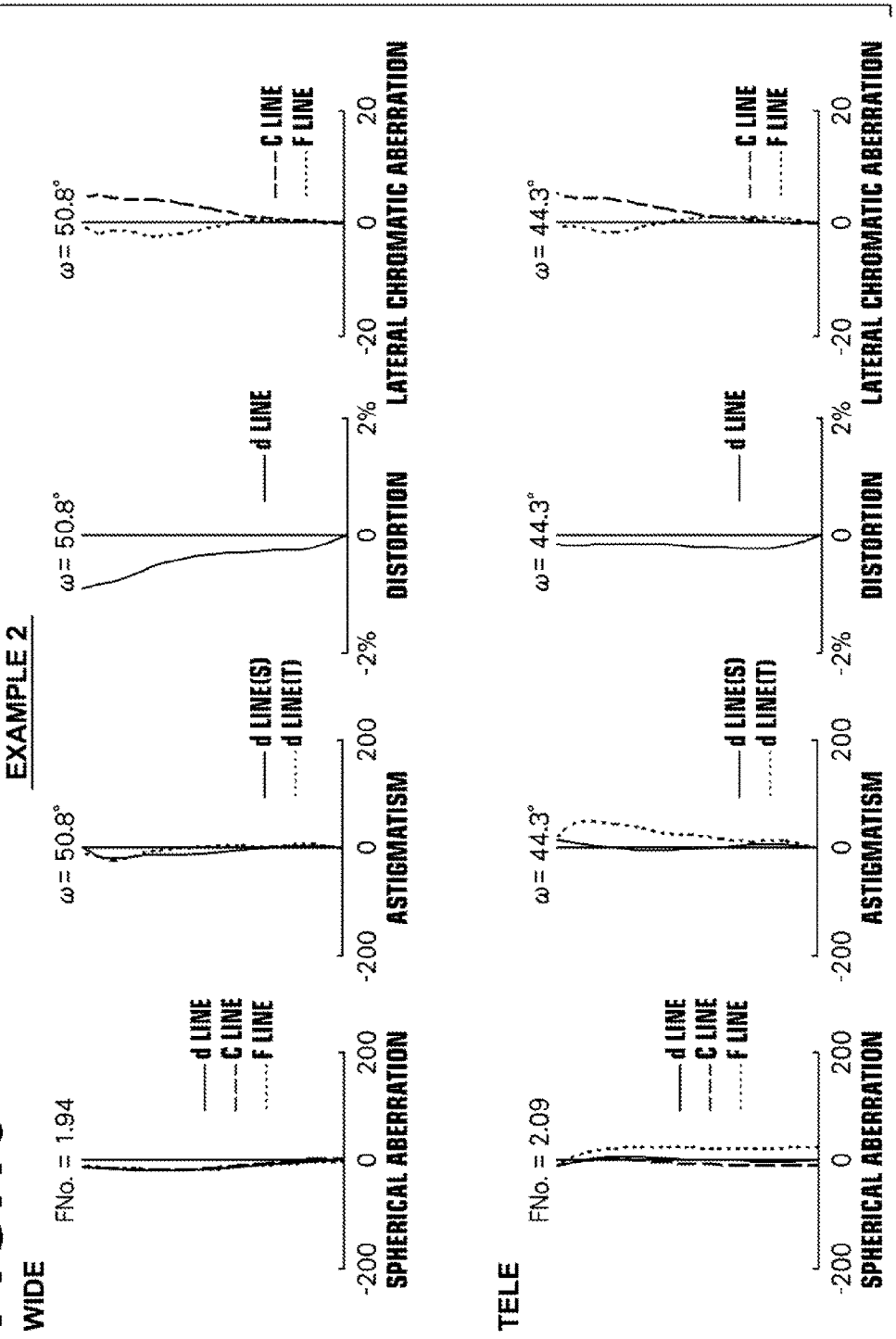
FIG. 10 is a collection of diagrams that illustrate aberrations of the projection zoom lens according to Example 2, the diagrams illustrating spherical aberration, astigmatism, distortion, and lateral chromatic aberrations in this order from the left side of the drawing sheet.

Hereinafter, embodiments of the present disclosure will be described in detail with reference to the accompanying drawings. FIG. 1 through FIG. 8 are collections of sectional diagrams that illustrate the lens configuration of and the trajectories of axial light rays 4 and light rays 5 at a maximum image height through a projection zoom lens according to embodiments of the present disclosure that respectively correspond to projection zoom lenses of Examples 1 through 8 to be described later. The basic configurations of the examples illustrated in FIG. 1 through FIG. 8 are the same, and the manners in which FIG. 1 through FIG. 8 are illustrated are also the same. Therefore, the projection zoom lenses according to the embodiments of the present disclosure will be described mainly with reference to FIG. 1 below.

In FIG. 1, the left side is the magnification side, and the right side is the reduction side. The upper portion of FIG. 1 labeled "WIDE" illustrates the state of the projection zoom lens at the wide angle end, and the lower portion of FIG. 1 labeled "TELE" illustrates the state of the projection zoom lens at the telephoto end. Arrows that schematically indicate the directions of movement of each lens group as magnification is changed from the wide angle end to the telephoto end are illustrated between the upper portion and the lower portion of FIG. 1.

This projection zoom lens is capable of being utilized as a projection zoom lens which is mounted on a projection type display device, for example, and projects image information displayed on a light valve onto a screen. Presuming a case in which the projection zoom lens is mounted on a projection type display device, a glass block 2, which functions as a prism, various filters, a cover glass, etc., and an image display surface 1 of a light valve, positioned at the surface of the glass block 2 toward the reduction side, are also illustrated in FIG. 1.

In the projection type display device, light beams, to which the image information is imparted by the image display surface 1, enter the projection zoom lens via the glass block 2. The projection zoom lens projects the beams onto a screen (not shown) disposed toward the left side direction of the drawing sheet.

Note that although FIG. 1 illustrates an example in which the position of the surface of the glass block 2 toward the reduction side and the position of the image display surface 1 are the same, the projection zoom lens of the present disclosure is not limited to such a configuration. In addition, FIG. 1 illustrates only one image display surface 1. However, the projection type display device may be configured to separate beams from a light source into three primary colors with a color separating optical system. In this case, three light valves that respectively correspond to the three primary colors may be provided, to enable display of full color images.

The projection zoom lens of the present embodiment essentially consists of, in order from the magnification side to the reduction side, a first lens group G1 having a negative refractive power, a second lens group G2 having a positive refractive power, a third lens group G3, a fourth lens group G4 having a positive refractive power, a fifth lens group G5, and a sixth lens group G6 having a positive refractive power.

Adopting a six group configuration is advantageous from the viewpoint of suppressing fluctuations in aberrations when changing magnification. Configuring the first lens group G1, which is the lens group most toward the magnification side, to be a negative lens group, is advantageous from the viewpoint of widening the angle of view. Configuring the second lens group G2 to be a positive lens group is advantageous from the viewpoint of suppressing increases in the diameters of the first and second lenses from the magnification side within the first lens group G1. In addition, this configuration is also advantageous from the viewpoint of widening the angle of view, because the negative first lens group and the positive second lens group can function as a wide converter with respect to the third lens group G3 and the lens groups more toward the reduction side than the third lens group G3.

In the projection zoom lens of the present embodiment, the distances among all adjacent lens groups change when changing magnification. The distance between the first lens group G1 and the second lens group G2 is shorter at the telephoto end than at the wide angle end, the distance between the second lens group G2 and the third lens group G3 is longer at the telephoto end than at the wide angle end, the distance between the third lens group G3 and the fourth lens group G4 is shorter at the telephoto end than at the wide angle end, the distance between the fourth lens group G4 and the fifth lens group G5 is longer at the telephoto end than at the wide angle end, and the distance between the fifth lens group G5 and the sixth lens group G6 is longer at the telephoto end than at the wide angle end.

By the distance between the first lens group G1 and the second lens group G2 being shorter at the telephoto end than at the wide angle end, the angular magnification ratio of an optical system formed by a combination of the first lens group G1 and the second lens group G2 can be increased, which is advantageous from the viewpoint of configuring a variable magnification optical system. By the distance between the second lens group G2 and the third lens group G3 being longer at the telephoto end than at the wide angle end, the distance between the second lens group G2 and the third lens group G3 can be shorter at the wide angle end, the amount of variation in the height of a principal light ray at a maximum angle of view due to changes in magnification can be decreased. In addition, variations in distortion and lateral chromatic aberration when changing magnification can also be suppressed.

By the distance between the third lens group G3 and the fourth lens group G4 being shorter at the telephoto end than at the wide angle end, variation in the telecentric properties at the reduction side when changing magnification can be suppressed. In addition, such a configuration is advantageous from the viewpoint of correcting variations in the position of the imaging plane when changing magnification. By the distance between the fourth lens group G4 and the fifth lens group G5 being longer at the telephoto end than at the wide angle end, variations in lateral chromatic aberration when changing magnification can be suppressed. By the distance between the fifth lens group G5 and the sixth lens group G6 being longer at the telephoto end than at the wide angle end, variations in lateral chromatic aberration when changing magnification can be suppressed.

The projection zoom lens of the present embodiment is constituted by six lens groups having the power arrangement described above, and the distances among adjacent lens groups change in the manners described above when changing magnification. Thereby, a configuration suited for an increased number of pixels is achieved.

The first lens group G1 and the sixth lens group G6 may be fixed when changing magnification and four lens groups, which are the second lens group G2 through the fifth lens group G5, may move as in the example illustrated in FIG. 1. For example, the movements of the lens groups in the projection zoom lens of the example illustrated in FIG. 1 are as follows. That is, in the example illustrated in FIG. 1, the first lens group G1 and the sixth lens group G6 are fixed, the second lens group G2 through the fifth lens group G5 all constantly move toward the magnification side, the distance between the first lens group G1 and the second lens group G2 constantly decreases, the distance between the second lens group G2 and the third lens group G3 constantly increases, the distance between the third lens group G3 and the fourth lens group G4 constantly decreases, the distance between the fourth lens group G4 and the fifth lens group G5 constantly increases, and the distance between the fifth lens group G5 and the sixth lens group G6 constantly increases, when changing magnification from the wide angle end to the telephoto end. However, in the present disclosure, the movements of each lens group when changing magnification may differ from those of the example illustrated in FIG. 1.

A lens having a negative refractive power in the paraxial region is provided most toward the magnification side within the first lens group G1. Arranging a negative refractive power at the most magnification side is advantageous from the viewpoint of securing a back focus sufficiently long enough to insert a prism or the like between the lens system and the image display surface 1.

It is preferable for the lens surface most toward the magnification side within the first lens group G1 to have a concave surface toward the magnification side in the paraxial region. This configuration is particularly advantageous from the viewpoint of correcting astigmatism.

In addition, it is preferable for the lens surface most toward the magnification side within the first lens group G1 to be of an aspherical shape having a concave surface toward the magnification side in the paraxial region, a region at which the negative refractive power becomes weaker than that in the paraxial region toward the exterior of the paraxial region in the radial direction, and an inflection point within the effective diameter thereof. In this case, the generation of negative distortion that accompanies a widening of the angle of view can be suppressed. Note that the effective diameter refers to the diameter of a circle formed by points most toward the exterior (points farthest from the optical axis) from among points at which light rays that contribute to image formation intersect with the surface of the lens. In addition, an aspherical shape having an inflection point is an aspherical shape having a point at which the cross sectional shape of the lens that includes the optical axis changes from a concave shape to a convex shape (or from a convex shape to a concave shape).

It is preferable for the first lens group G1 to have at least one positive lens. In this case, lateral chromatic aberration and distortion can be favorably corrected. In addition, such a configuration is advantageous from the viewpoint of widening the angle of view.

Specifically, for example, it is preferable for the first lens group G1 to essentially consist of, in order from the magnification side to the reduction side, a negative lens having a concave surface toward the magnification side, a lens having a convex surface toward the magnification side, a negative lens having a concave surface toward the reduction side, a biconcave lens, and a cemented lens formed by cementing a positive lens and a negative lens together. By distributing the negative refractive power of the first lens group G1 among at least four lenses, the generation of distortion can be suppressed. Configuring the second lens from the magnification side within the first lens group G1 to be a lens having a convex surface toward the magnification side is advantageous from the viewpoint of correcting distortion at low angles of view. Longitudinal chromatic aberration and lateral chromatic aberration which are generated in the first lens group G1 can be corrected, by providing the cemented lens formed by cementing a positive lens and a negative lens together at the most reduction side within the first lens group G1.

The first lens group G1 of the example illustrated in FIG. 1 consists of, in order from the magnification side to the reduction side, a first lens L11 having a negative meniscus shape with a concave surface toward the magnification side in the paraxial region, a second lens L12 having a positive meniscus shape with a convex surface toward the magnification side in the paraxial region, a third lens L13 having a negative meniscus shape with a convex surface toward the magnification side, a biconcave lens L14, a positive lens L15, and a negative lens L16. The lens L15 and the lens L16 are cemented together. However, the cemented lens provided most toward the reduction side within the first lens group G1 may be of a configuration in which a negative lens and a positive lens, provided in this order from the magnification side, are cemented together is also possible, as in the example illustrated in FIG. 3.

In the case that the first lens group G1 consists of six lenses, when the projection distance changes, the first through third lenses from the magnification side may be moved integrally in the direction of the optical axis, or the fourth through sixth lenses from the magnification side may be moved integrally in the direction of the optical axis to perform focusing when the projection distance changes. Alternatively, a group consisting of the first through third lenses from the magnification side within the first lens group G1 may be designated as a front group, a group consisting of the fourth through sixth lenses from the magnification side within the first lens group G1 may be designated as a rear group, and the front and rear groups may be moved along different trajectories in the direction of the optical axis to perform focusing operations. In this case, fluctuations in aberrations during focusing operations can be suppressed to a greater degree.

The second lens group G2 may essentially consist of a single biconvex lens. In this case, such a configuration is advantageous from the viewpoints of miniaturization and weight reduction. The second lens group G2 of the example illustrated in FIG. 1 consists only of a biconvex lens L21.

It is preferable for the third lens group G3 to essentially consist of, in order from the magnification side to the reduction side, a positive lens having a convex surface toward the magnification side and a negative lens having a concave surface toward the magnification side. In this case, axial aberrations and off axis aberrations can be corrected with favorable balance. The third lens group G3 of the example illustrated in FIG. 1 consists of a lens L31 and a lens L32 having the above preferable configuration. Note that the third lens group G3 may be a lens group having a negative refractive power as in the example illustrated in FIG. 1, or may be a lens group having a positive refractive power as in the example illustrated in FIG. 3.

The fourth lens group may essentially consist of a single positive lens. Such a configuration is advantageous from the viewpoints of miniaturization and weight reduction. The fourth lens group G4 of the example illustrated in FIG. 1 consists only of a biconvex lens L41.

The fifth lens group G5 is configured to have at least one negative lens. Thereby, fluctuations in lateral chromatic aberration while changing magnification can be cancelled, while longitudinal chromatic aberration can be favorably corrected throughout the entire zoom range. The fifth lens group G5 may be a lens group having a positive refractive power, for example.

The fifth lens group G5 of the example illustrated in FIG. 1 consists of, in order from the magnification side to the reduction side, a negative lens L51, a positive lens L52, a negative lens L53, a negative lens L54, a positive lens L55, and a positive lens L56. The lens L52 and the lens L53 are cemented together, and the lens L54 and the lens L55 are cemented together.

The sixth lens group G6 may essentially consist of a single positive lens. Such a configuration is advantageous from the viewpoints of miniaturization and weight reduction. The sixth lens group G6 of the example illustrated in FIG. 1 is constituted only by a biconvex lens L61.

The projection zoom lens of the present embodiment may adopt the preferred configurations above as appropriate, and may assume the following two aspects, for example.

A projection zoom lens of a first aspect essentially consists of, in order from the magnification side to the reduction side: a first lens group G1 having a negative refractive power; a second lens group G2 having a positive refractive power; a third lens group G3; a fourth lens group G4 having a positive refractive power; a fifth lens group G5; and a sixth lens group G6 having a positive refractive power; the distances among all adjacent lens groups changing when changing magnification; the distance between the first lens group G1 and the second lens group G2 being shorter at the telephoto end than at the wide angle end; the distance between the second lens group G2 and the third lens group G3 being longer at the telephoto end than at the wide angle end; the distance between the third lens group G3 and the fourth lens group G4 being shorter at the telephoto end than at the wide angle end; the distance between the fourth lens group G4 and the fifth lens group G5 being longer at the telephoto end than at the wide angle end; the distance between the fifth lens group G5 and the sixth lens group G6 being longer at the telephoto end than at the wide angle end; a lens having a concave surface toward the magnification side in the paraxial region and a negative refractive power in the paraxial region being provided most toward the magnification side in the first lens group G1; and the fifth lens group G5 having at least one negative lens.

A projection zoom lens of a second aspect essentially consists of, in order from the magnification side to the reduction side: a first lens group G1 having a negative refractive power; a second lens group G2 having a positive refractive power; a third lens group G3; a fourth lens group G4 having a positive refractive power; a fifth lens group G5; and a sixth lens group G6 having a positive refractive power; the distances among all adjacent lens groups changing when changing magnification; the distance between the first lens group G1 and the second lens group G2 being shorter at the telephoto end than at the wide angle end; the distance between the second lens group G2 and the third lens group G3 being longer at the telephoto end than at the wide angle end; the distance between the third lens group G3 and the fourth lens group G4 being shorter at the telephoto end than at the wide angle end; the distance between the fourth lens group G4 and the fifth lens group G5 being longer at the telephoto end than at the wide angle end; the distance between the fifth lens group G5 and the sixth lens group G6 being longer at the telephoto end than at the wide angle end; a lens having a negative refractive power in the paraxial region being provided most toward the magnification side in the first lens group G1; the first lens group G1 having at least one positive lens; and the fifth lens group G5 having at least one negative lens.

In addition, in the projection zoom lens of the present embodiment, it is preferable for one or arbitrary combinations of Conditional Formulae (1) through (6). Note that with respect to Conditional Formula (5) it is preferable for this conditional formula to be satisfied in the case that the fifth lens group has at least one positive lens. In the case that there is only one negative lens in the fifth lens group G5, G5Nvd below is the Abbe's number of the one negative lens with respect to the d line. In the case that there is only one positive lens in the fifth lens group G5, G5Pvd below is the Abbe's number of the one positive lens with respect to the d line.

$$-0.2 < fw/f12w < 0.3 \quad (1)$$

$$-0.2 < fw/f3 < 0.2 \quad (2)$$

$$0 < fw/f5 < 0.2 \quad (3)$$

$$35 < G5Nvd < 55 \quad (4)$$

$$62 < G5Pvd \quad (5)$$

$$-1.2 < fw/f1 < -0.3 \quad (6)$$

wherein fw is the focal length of the entire projection zoom lens at the wide angle end, f1 is the focal length of the first lens group, f3 is the focal length of the third lens group, f5 is the focal length of the fifth lens group, f12w is the combined focal length of the first lens group and the second lens group at the wide angle end, G5Nvd is the average Abbe's number of negative lenses that constitute the fifth lens group with respect to the d line, and G5Pvd is the average Abbe's number of positive lenses that constitute the fifth lens group with respect to the d line.

By configuring the projection zoom lens such that the value of fw/f12w is not less than or equal to the lower limit defined in Conditional Formula (1), the heights of axial marginal light rays that enter the third lens group G3 can be suppressed, which is advantageous from the viewpoint of correcting spherical aberration. Configuring the projection zoom lens such that the value of fw/f12w is not greater than or equal to the upper limit defined in Conditional Formula (1) is advantageous from the viewpoint of widening the angle of view. It is more preferable for Conditional Formula (1-1) below to be satisfied, in order to cause the advantageous effects related to Conditional Formula (1) described above to become more prominent.

$$-0.1 < fw/f12w < 0.2 \quad (1-1)$$

By configuring the projection zoom lens such that the value of fw/f3 is not less than or equal to the lower limit defined in Conditional Formula (2), the heights of axial marginal light rays that enter the fourth lens group G4 can be suppressed, which is advantageous from the viewpoint of correcting spherical aberration. By configuring the projection zoom lens such that the value of fw/f3 is not greater than or equal to the upper limit defined in Conditional Formula (2), a decrease in the contribution of the change in the distance between the third lens group G3 and the fourth lens group G4 to changes in magnification can be suppressed when changing magnification. As a result, the burden borne by the second lens group G2 and the fifth lens group G5 to change magnification can be decreased. It is more preferable for Conditional Formula (2-1) below to be satisfied, in order to cause the advantageous effects related to Conditional Formula (2) described above to become more prominent.

$$-0.1 < fw/f3 < 0.1 \quad (2-1)$$

By configuring the projection zoom lens such that the value of fw/f5 is not less than or equal to the lower limit defined in Conditional Formula (3), the diameter of the fifth lens group G5 can be prevented from increasing, while the telecentric properties at the reduction side can be maintained. By configuring the projection zoom lens such that the value of fw/f5 is not greater than or equal to the upper limit defined in Conditional Formula (3), lateral chromatic aberration and distortion can be favorably corrected. It is more preferable for Conditional Formula (3-1) below to be satisfied, in order to cause the advantageous effects related to Conditional Formula (3) described above to become more prominent.

$$0.04 < fw/f5 < 0.1 \quad (3-1)$$

Configuring the projection zoom lens such that the value of G5Nvd is not less than or equal to the lower limit defined in Conditional Formula (4) is advantageous from the viewpoint of correcting secondary chromatic aberration. Configuring the projection zoom lens such that the value of G5Nvd is not greater than or equal to the upper limit defined in Conditional Formula (4) is advantageous from the viewpoint of correcting longitudinal chromatic aberration. It is more preferable for Conditional Formula (4-1) below to be satisfied, in order to cause the advantageous effects related to Conditional Formula (4) described above to become more prominent.

$$40 < G5Nvd < 50 \quad (4-1)$$

By configuring the projection zoom lens such that the value of G5Pvd is not less than or equal to the lower limit defined in Conditional Formula (5), longitudinal chromatic aberration being insufficiently corrected can be avoided, which is advantageous from the viewpoint of correcting longitudinal chromatic aberration. It is more preferable for Conditional Formula (5-1) below to be satisfied, in order to cause the advantageous effects related to Conditional Formula (5) described above to become more prominent. It is even more preferable for Conditional Formulae (5-2) and (5-3) below to be satisfied. By configuring the projection zoom lens such that the value of G5Pvd is not greater than or equal to the upper limit defined in Conditional Formula (5-2) and (5-3), longitudinal chromatic aberration being excessively corrected can be avoided, which is advantageous from the viewpoint of correcting longitudinal chromatic aberration.

$$70 < G5Pvd \quad (5-1)$$

$$62 < G5Pvd < 100 \quad (5-2)$$

$$70 < G5Pvd < 100 \quad (5-3)$$

By configuring the projection zoom lens such that the value of fw/f1 is not less than or equal to the lower limit defined in Conditional Formula (6), the heights of axial marginal light rays that enter the second lens group G2 can be suppressed, which is advantageous from the viewpoint of correcting spherical aberration. Configuring the projection zoom lens such that the value of fw/f1 is not greater than or equal to the upper limit defined in Conditional Formula (6) is advantageous from the viewpoint of widening the angle of view. It is more preferable for Conditional Formula (6-1) below to be satisfied, in order to cause the advantageous effects related to Conditional Formula (6) described above to become more prominent.

$$-1.0 < fw/f1 < -0.4 \quad (6-1)$$

In addition, it is preferable for Conditional Formula (7) below to be satisfied, in the case that second lens group G2 essentially consists of only a single biconvex lens.

$$40 < G2vd < 50 \quad (7)$$

wherein G2vd is the Abbe's number of the biconvex lens that constitutes the second lens group with respect to the d line.

Configuring the projection zoom lens such that the value of G2vd is not less than or equal to the lower limit defined in Conditional Formula (7) is advantageous from the viewpoint of suppressing fluctuations in longitudinal chromatic aberration when changing magnification. Configuring the projection zoom lens such that the value of G2vd is not greater than or equal to the upper limit defined in Conditional Formula (7) is advantageous from the viewpoint of correcting lateral chromatic aberration.

In addition, it is preferable for the projection zoom lens of the present embodiment to be configured such that it is telecentric at the reduction side, depending on the light valve to be utilized therewith. In this case, the projection zoom lens will be favorable for use in a projection type display device in which a cross prism, a total reflecting prism, and the like are provided between the lens system and the image display surface 1.

In addition, it is preferable for the angles formed by angular bisecting lines of the upper maximum light ray and the lower maximum light ray of the cross sections of light beams which are focused on arbitrary points on an imaging plane at the reduction side and the principal light ray of the light beams to be within a range from −3° to +3°, in order to suppress losses in illuminating light and to take illuminating light into the projection zoom lens.

In addition, it is preferable for distortion to be suppressed such that it is within a range from −2% to +2% throughout the entire zoom range in the projection zoom lens of the present disclosure. In addition, it is preferable for the F number of the projection zoom lens of the present disclosure to be 3.0 or less, and more preferably 2.5 or less.

Note that it is possible to adopt arbitrary combinations of the preferable configurations and the possible configurations described above. It is preferable for the configurations described above to be selectively adopted as appropriate, according to items desired of the projection zoom lens.

Next, specific examples of the projection zoom lens of the present disclosure will be described. Note that the numerical value data of the examples to be indicated hereinbelow are those which are normalized such that the focal length of the entire lens system at the wide angle end when the projection distance is infinity will be 10.00, and are rounded off at a predetermined number of digits.

Example 1

The lens configuration of a projection zoom lens of Example 1 is illustrated in FIG. 1. Because a description has already been given regarding FIG. 1, redundant descriptions will be omitted here. Numerical value data that indicate the detailed configuration of the projection zoom lens of Example 1 are shown in Table 1 through Table 3. Table 1 shows basic lens data, Table 2 shows aspherical surface coefficients, and Table 3 shows items related to the d line as well as the values of variable distances among surfaces.

In Table 1, ith (i=1, 2, 3, . . . ) lens surface numbers that sequentially increase from the magnification side to the reduction side, with the lens surface at the most magnification side designated as first, are shown in the column Si. The radii of ith surfaces are shown in the column Ri, the distances between an ith surface and an i+1 st surface along the optical axis Z are shown in the column Di. The refractive indices of jth (j=1, 2, 3, . . . ) constituent elements that sequentially increase from the magnification side to the reduction side, with the constituent element at the most magnification side designated as first, with respect to the d line (wavelength: 587.6 nm) are shown in the column Ndj. The Abbe's numbers of the jth constituent elements with respect to the d line are shown in the column vdj.

Note that the signs of the radii of curvature are positive in cases that the surface shape is convex toward the magnification side, and negative in cases that the surface shape is convex toward the reduction side. The glass block 2 is also shown in the basic lens data. An "*" is indicated along with the surface numbers of aspherical surfaces, and numerical values related to the paraxial radii of curvature are shown in the column that shows the radii of curvature for the aspherical surfaces.

Table 2 shows the aspherical surface coefficients of each aspherical surface of Example 1. In the numerical values shown as the aspherical surface data, the symbol "E-n" (n is an integer) means "·$10^{-n}$". The aspherical surface coefficients are the coefficients KA and Am (m is an integer 3 or greater, and differs for each aspherical surface) represented by the aspherical surface shape formula below.

$$Zd = \frac{C \times h^2}{1 + \sqrt{1 - KA \times C^2 \times h^2}} + \sum_m Am \times h^m$$

wherein: Zd is the depth of the aspherical surface (the length of a normal line from a point on an aspherical surface at a height h to a plane perpendicular to the optical axis that contacts the peak of the aspherical surface), h is the height (the distance from the optical axis to the surface of the lens), C is the paraxial curvature, and KA and Am are aspherical surface coefficients.

In Table 1, the variable distances between surfaces are represented by the notation "DD[ ]". The surface number toward the magnification side is shown in the brackets [ ], and written in the column Di. DD[6] is a variable distance between surfaces that changes during focusing operations. DD[11], DD[13], DD[17], DD[19], and DD[29] are the distance between the first lens group G1 and the second lens group G2, the distance between the second lens group G2 and the third lens group G3, the distance between the third lens group G3 and the fourth lens group G4, the distance between the fourth lens group G4 and the fifth lens group G5, and the distance between the fifth lens group G5 and the sixth lens group G6, respectively. All of the distances DD[11], DD[13], DD[17], DD[19], and DD[29] change when changing magnification.

Table 3 shows the values of zoom ratios Zr, the focal length f' of the entire system, the back focus Bf' in the case that the reduction side is designated as the back side as an air converted distance, the F number FNo., the full angle of view 2ω (units are degrees), and the aforementioned variable distances between surfaces at the wide angle end and at the telephoto end. Table 3 shows the above values at the wide angle end and at the telephoto end under the columns WIDE and TELE, respectively. In addition, Table 3 shows the values of Bf' and f' only for cases in which the projection distance is infinity, and the values of the other items are shown for cases in which the projection distance is infinity and for cases in which the projection distance is 2300. Note that the values shown in Table 3 are related to the d line. Here, the projection distance is the distance from the surface of the projection zoom lens most toward the magnification side to a projection surface (screen).

TABLE 1

Example 1

| Si | Ri | Di | Ndj | vdj |
|---|---|---|---|---|
| *1 | −44.025 | 6.38 | 1.49100 | 57.56 |
| *2 | −285.080 | 2.41 | | |
| *3 | 85.961 | 5.40 | 1.49100 | 57.56 |
| *4 | 102.484 | 11.70 | | |
| 5 | 1131.589 | 2.45 | 1.79952 | 42.22 |
| 6 | 26.255 | DD[6] | | |

TABLE 1-continued

Example 1

| Si | Ri | Di | Ndj | vdj |
|---|---|---|---|---|
| 7 | −77.802 | 3.78 | 1.58913 | 61.14 |
| 8 | 66.732 | 7.53 | | |
| 9 | 356.450 | 8.84 | 1.56732 | 42.82 |
| 10 | −50.682 | 2.45 | 1.58913 | 61.14 |
| 11 | 5416.085 | DD[11] | | |
| 12 | 87.369 | 7.85 | 1.80400 | 46.58 |
| 13 | −102.642 | DD[13] | | |
| 14 | 87.817 | 4.91 | 1.80610 | 33.27 |
| 15 | 1169.347 | 3.81 | | |
| 16 | −66.046 | 1.52 | 1.80100 | 34.97 |
| 17 | −313.068 | DD[17] | | |
| 18 | 47.031 | 5.75 | 1.49700 | 81.54 |
| 19 | −190.027 | DD[19] | | |
| *20 | 60.210 | 1.57 | 1.80610 | 40.92 |
| *21 | 24.011 | 1.47 | | |
| 22 | 32.973 | 11.09 | 1.49700 | 81.54 |
| 23 | −15.246 | 1.96 | 1.80400 | 46.58 |
| 24 | −77.177 | 0.98 | | |
| 25 | −84.374 | 2.51 | 1.80400 | 46.58 |
| 26 | 40.702 | 6.16 | 1.49700 | 81.54 |
| 27 | −44.575 | 0.30 | | |
| 28 | 81.957 | 9.47 | 1.49700 | 81.54 |
| 29 | −34.957 | DD[29] | | |
| 30 | 242.927 | 5.89 | 1.57099 | 50.80 |
| 31 | −64.391 | 17.18 | | |
| 32 | ∞ | 24.54 | 1.51633 | 64.14 |
| 33 | ∞ | | | |

TABLE 2

Example 1

| | Surface Number | | | |
|---|---|---|---|---|
| | 1 | 2 | 3 | 4 |
| KA | −1.1511294E+00 | 2.8359080E+01 | 7.6175218E−01 | 5.5791439E+00 |
| A3 | 1.1408865E−17 | −1.0335665E−17 | 1.7394640E−19 | 6.8737395E−20 |
| A4 | 2.5932106E−05 | 3.9913358E−05 | 2.7909455E−05 | 1.9531778E−05 |
| A5 | 3.7859886E−06 | 4.1167138E−06 | 3.5962453E−06 | 2.1584711E−06 |
| A6 | −5.4041740E−07 | −4.4390950E−07 | −2.7409973E−07 | −1.5376847E−07 |
| A7 | 2.9006908E−08 | 1.0718728E−08 | −1.0509789E−08 | −1.3644595E−08 |
| A8 | −8.3970634E−10 | −1.5876735E−10 | 8.8694157E−10 | 9.7400545E−10 |
| A9 | 1.2357940E−11 | 1.5097045E−11 | 9.1135123E−12 | 2.5126028E−11 |
| A10 | 3.6101027E−15 | −5.4058651E−13 | −1.4267662E−12 | −2.5394194E−12 |
| A11 | −4.1044485E−15 | −3.4758860E−16 | 5.0578452E−15 | −9.9343932E−15 |
| A12 | 8.8857803E−17 | 2.7801389E−16 | 1.2241630E−15 | 3.2128011E−15 |
| A13 | −9.7408533E−19 | −1.6510974E−18 | −1.3894452E−17 | −1.8613632E−17 |
| A14 | 5.4647838E−21 | −8.0858106E−20 | −5.3516198E−19 | −1.9825199E−18 |
| A15 | −9.6378263E−25 | 7.5458807E−22 | 8.6677171E−21 | 2.1155673E−20 |
| A16 | −2.6799893E−25 | 1.1236040E−23 | 9.3713835E−23 | 4.8035222E−22 |
| A17 | 1.9033741E−27 | −1.3490795E−25 | −1.8220479E−24 | −6.3528755E−24 |

| | Surface Number | |
|---|---|---|
| | 20 | 21 |
| KA | 1.0000000E+00 | 1.0000000E+00 |
| A4 | −3.1339207E−06 | −6.9940057E−06 |
| A6 | −6.5823280E−09 | −2.8385450E−08 |
| A8 | 2.3976406E−10 | 2.1861933E−10 |
| A10 | −5.3725834E−14 | 4.5565083E−14 |
| A12 | −1.2142973E−15 | −1.7339414E−15 |
| A14 | −2.6242020E−21 | −3.1230212E−18 |
| A16 | 1.3552174E−24 | 9.7298511E−26 |
| A18 | 5.8724401E−30 | −1.5936287E−29 |

TABLE 3

Example 1

| | Projection Distance = ∞ | | Projection Distance = 2300 | |
|---|---|---|---|---|
| | WIDE | TELE | WIDE | TELE |
| Zr | 1.0 | 1.25 | 1.0 | 1.25 |
| f | 10.00 | 12.50 | | |
| Bf | 33.37 | 33.37 | | |
| FNo. | 1.90 | 2.13 | 1.90 | 2.13 |
| 2ω[°] | 102.4 | 89.4 | 101.6 | 88.6 |
| DD[6] | 20.36 | 20.36 | 18.86 | 18.86 |
| DD[11] | 14.41 | 6.15 | 14.99 | 6.72 |
| DD[13] | 19.39 | 26.08 | 19.39 | 26.08 |
| DD[17] | 19.19 | 2.25 | 19.19 | 2.25 |
| DD[19] | 8.13 | 18.77 | 8.13 | 18.77 |
| DD[29] | 0.29 | 8.17 | 0.29 | 8.17 |

The spherical aberration, the astigmatism, the distortion, the lateral chromatic aberration (chromatic aberration of magnification rates) for a case in which the projection distance is 2300 are illustrated in aberration diagrams in order from the left to the right of FIG. 9. Aberrations in a state in which the projection zoom lens is at the wide angle end are illustrated in the upper half of FIG. 9 labeled WIDE, and aberrations in a state in which the projection zoom lens is at the telephoto end are illustrated in the lower half of FIG. 9 labeled TELE. In the diagram that illustrates spherical aberration in FIG. 9, aberrations related to the d line (wavelength: 587.6 nm), the C line (wavelength: 656.3 nm), and the F line (wavelength: 486.1 nm) are indicated by a solid line, a long broken line, and a short broken line, respectively. In the diagram that illustrates astigmatism, aberrations related to the d line in the sagittal direction and the tangential direction are indicated by a solid line and a broken line, respectively. In the diagram that illustrates distortion, aberration related to the d line is indicated by a solid line. In the diagram that illustrates lateral chromatic aberration, aberrations related to the C line and the F line are indicated by a long broken line and a short broken line, respectively. In the diagram that illustrates spherical aberration, "FNo." denotes the F number, and in the diagrams that illustrate other aberrations, "ω" denotes half angles of view.

The symbols, the meanings, and the manners in which the various pieces of data are described in the description of Example 1 above are the same for the examples to be described below unless otherwise noted. Therefore, the redundant portions will be omitted from the following descriptions of the other examples.

Example 2

The lens configuration of the projection zoom lens of Example 2 is illustrated in FIG. 2. Note that the movements of each lens group of the projection zoom lens when changing magnification in the example illustrated in FIG. 2 are as follows. That is, the first lens group G1 and the sixth lens group G6 are fixed, the second lens group G2, the fourth lens group G4, and the fifth lens group G5 all constantly move toward the magnification side, and the third lens group G3 moves toward the magnification side and then toward the reduction side, when changing magnification from the wide angle end to the telephoto end. The distance between the first lens group G1 and the second lens group G2 constantly decreases, the distance between the fourth lens group G4 and the fifth lens group G5 constantly increases, and the distance between the fifth lens group G5 and the sixth lens group G6 constantly increases, when changing magnification from the wide angle end to the telephoto end. The position of the third lens group G3 at the telephoto end is more toward the reduction side compared to the position of the third lens group G3 at the wide angle end.

Basic lens data are shown in Table 4, aspherical surface coefficients are shown in Table 5, and the values of various items and the variable distances between surfaces are shown in Table 6 for the projection zoom lens of Example 2. The spherical aberration, the astigmatism, the distortion, the lateral chromatic aberration of the projection zoom lens of Example 2 for a case in which the projection distance is 2300 are illustrated in aberration diagrams in order from the left to the right of FIG. 10.

TABLE 4

| | | Example 2 | | |
|---|---|---|---|---|
| Si | Ri | Di | Ndj | vdj |
| *1 | −44.275 | 6.41 | 1.49100 | 57.56 |
| *2 | −276.344 | 1.57 | | |
| *3 | 88.102 | 5.42 | 1.49100 | 57.56 |
| *4 | 99.424 | 10.84 | | |
| 5 | 1160.204 | 2.47 | 1.79952 | 42.22 |
| 6 | 26.304 | DD[6] | | |
| 7 | −66.469 | 2.69 | 1.58913 | 61.14 |
| 8 | 61.077 | 5.29 | | |
| 9 | 256.911 | 8.89 | 1.56732 | 42.82 |
| 10 | −39.362 | 2.00 | 1.58913 | 61.14 |
| 11 | −442.745 | DD[11] | | |
| 12 | 83.870 | 7.89 | 1.80400 | 46.58 |
| 13 | −92.422 | DD[13] | | |
| 14 | 96.265 | 4.97 | 1.80610 | 33.27 |
| 15 | 958.487 | 1.69 | | |
| 16 | −62.914 | 1.75 | 1.80100 | 34.97 |
| 17 | −213.964 | DD[17] | | |
| 18 | 40.936 | 5.15 | 1.49700 | 81.54 |
| 19 | −495.641 | DD[19] | | |
| *20 | 68.808 | 2.27 | 1.80610 | 40.92 |
| *21 | 23.273 | 2.07 | | |
| 22 | 35.368 | 9.21 | 1.49700 | 81.54 |
| 23 | −14.852 | 1.97 | 1.80400 | 46.58 |
| 24 | −69.125 | 0.99 | | |
| 25 | −113.858 | 2.48 | 1.80400 | 46.58 |
| 26 | 41.049 | 6.03 | 1.49700 | 81.54 |
| 27 | −48.909 | 0.30 | | |
| 28 | 84.972 | 7.95 | 1.49700 | 81.54 |
| 29 | −33.154 | DD[29] | | |
| 30 | 165.433 | 5.92 | 1.57099 | 50.80 |
| 31 | −64.996 | 17.24 | | |
| 32 | ∞ | 24.66 | 1.51633 | 64.14 |
| 33 | ∞ | | | |

TABLE 5

| | Example 2 | | | |
|---|---|---|---|---|
| | Surface Number | | | |
| | 1 | 2 | 3 | 4 |
| KA | −1.1102790E+00 | 2.0377050E+01 | 1.9234933E+00 | 9.9174038E+00 |
| A3 | 1.2599713E−18 | −1.4915179E−17 | 8.4586941E−20 | −4.2796273E−20 |
| A4 | 2.6833652E−05 | 4.5179764E−05 | 3.2153415E−05 | 2.2044009E−05 |
| A5 | 3.8491015E−06 | 4.1300139E−06 | 2.9643847E−06 | 4.7948047E−07 |
| A6 | −5.5587130E−07 | −4.4748255E−07 | −2.8514935E−07 | −6.6554511E−08 |
| A7 | 2.9831934E−08 | 1.0792618E−08 | −7.9321191E−09 | −8.6984369E−09 |
| A8 | −8.5914503E−10 | −8.8147359E−11 | 8.8250375E−10 | 5.3498973E−10 |
| A9 | 1.2695541E−11 | 1.4941530E−11 | 4.2855178E−12 | 2.2389406E−11 |
| A10 | −2.9314578E−15 | −6.3040351E−13 | −1.3715922E−12 | −1.6015022E−12 |

TABLE 5-continued

Example 2

| | | | | |
|---|---|---|---|---|
| A11 | −4.1895024E−15 | 2.8323249E−16 | 9.6404206E−15 | −2.1607517E−14 |
| A12 | 9.6478444E−17 | 3.3625822E−16 | 1.1434322E−15 | 2.2234094E−15 |
| A13 | −1.0687711E−18 | −2.2505823E−18 | −1.5938650E−17 | 4.4523777E−18 |
| A14 | 4.6917128E−21 | −1.0043948E−19 | −4.8733654E−19 | −1.4810549E−18 |
| A15 | 1.3092801E−23 | 1.0035733E−21 | 8.9193543E−21 | 4.7923491E−21 |
| A16 | −1.6915920E−25 | 1.3907457E−23 | 8.3369632E−23 | 3.8427065E−22 |
| A17 | 4.4287842E−28 | −1.7373829E−25 | −1.7713772E−24 | −2.1633447E−24 |

| | Surface Number | |
|---|---|---|
| | 20 | 21 |
| KA | 1.0000000E+00 | 1.0000000E+00 |
| A4 | −3.0909288E−06 | −6.8980602E−06 |
| A6 | −6.4325207E−09 | −2.7739425E−08 |
| A8 | 2.3215947E−10 | 2.1168539E−10 |
| A10 | −5.1544956E−14 | 4.3715471E−14 |
| A12 | −1.1543266E−15 | −1.6483070E−15 |
| A14 | −2.4717332E−21 | −2.9415705E−18 |
| A16 | 1.2647771E−24 | 9.0805299E−26 |
| A18 | 5.4303055E−30 | −1.4736448E−29 |

TABLE 6

Example 2

| | Projection Distance = ∞ | | Projection Distance = 2300 | |
|---|---|---|---|---|
| | WIDE | TELE | WIDE | TELE |
| Zr | 1.0 | 1.25 | 1.0 | 1.25 |
| f | 10.00 | 12.50 | | |
| Bf | 33.51 | 33.51 | | |
| FNo. | 1.94 | 2.09 | 1.94 | 2.09 |
| 2ω[°] | 102.6 | 89.6 | 101.6 | 88.6 |
| DD[6] | 19.97 | 19.97 | 18.00 | 18.00 |
| DD[11] | 13.82 | 6.22 | 14.59 | 6.99 |
| DD[13] | 17.62 | 25.50 | 17.62 | 25.50 |
| DD[17] | 21.59 | 3.14 | 21.59 | 3.14 |
| DD[19] | 8.06 | 18.35 | 8.06 | 18.35 |
| DD[29] | 0.30 | 8.18 | 0.30 | 8.18 |

Example 3

The lens configuration of the projection zoom lens of Example 3 is illustrated in FIG. 3. In the projection zoom lens of Example 3, the movements of each lens group of the projection zoom lens when changing magnification from the wide angle end to the telephoto end are substantially the same as those of Example 2 described above. However, the projection zoom lens of Example 3 differs from Example 2 in that the position of the third lens group G3 at the telephoto end is more toward the magnification side compared to the position of the third lens group G3 at the wide angle end.

Figure 11:
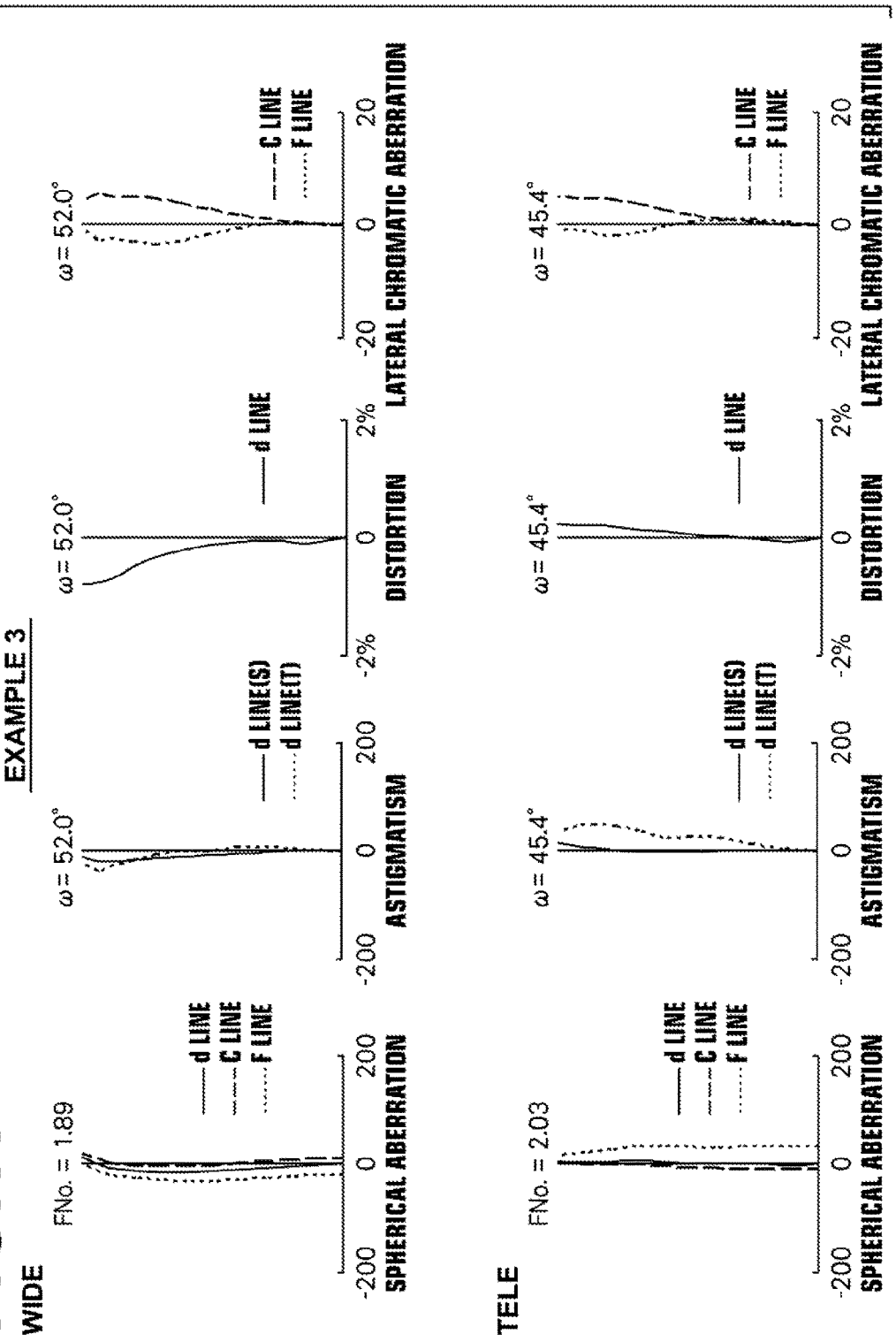
FIG. 11 is a collection of diagrams that illustrate aberrations of the projection zoom lens according to Example 3, the diagrams illustrating spherical aberration, astigmatism, distortion, and lateral chromatic aberrations in this order from the left side of the drawing sheet.

Basic lens data are shown in Table 7, aspherical surface coefficients are shown in Table 8, and the values of various items and the variable distances between surfaces are shown in Table 9 for the projection zoom lens of Example 3. The spherical aberration, the astigmatism, the distortion, the lateral chromatic aberration of the projection zoom lens of Example 3 for a case in which the projection distance is 2300 are illustrated in aberration diagrams in order from the left to the right of FIG. 11.

TABLE 7

Example 3

| Si | Ri | Di | Ndj | vdj |
|---|---|---|---|---|
| *1 | −49.046 | 6.63 | 1.49100 | 57.56 |
| *2 | −348.660 | 2.47 | | |
| *3 | 94.350 | 5.52 | 1.49100 | 57.56 |
| *4 | 101.667 | 14.36 | | |
| 5 | 21660.324 | 2.51 | 1.78590 | 44.20 |
| 6 | 28.662 | DD[6] | | |
| 7 | −84.476 | 2.51 | 1.58913 | 61.14 |
| 8 | 74.915 | 12.12 | | |
| 9 | 1340.477 | 2.42 | 1.62041 | 60.29 |
| 10 | 66.919 | 9.39 | 1.51742 | 52.43 |
| 11 | −355.755 | DD[11] | | |
| 12 | 94.469 | 8.03 | 1.80400 | 46.58 |
| 13 | −112.235 | DD[13] | | |
| 14 | 93.600 | 5.10 | 1.73800 | 32.26 |
| 15 | 1310.118 | 4.02 | | |
| 16 | −70.197 | 1.51 | 1.72047 | 34.71 |
| 17 | −255.671 | DD[17] | | |
| 18 | 49.182 | 4.68 | 1.49700 | 81.54 |
| 19 | −270.234 | DD[19] | | |
| *20 | 59.621 | 1.68 | 1.80610 | 40.92 |
| *21 | 24.896 | 1.78 | | |
| 22 | 35.306 | 10.19 | 1.49700 | 81.54 |
| 23 | −15.826 | 2.01 | 1.80400 | 46.58 |
| 24 | −80.598 | 1.00 | | |
| 25 | −69.220 | 2.52 | 1.79952 | 42.22 |
| 26 | 41.159 | 6.64 | 1.49700 | 81.54 |
| 27 | −45.031 | 0.30 | | |
| 28 | 85.205 | 8.04 | 1.49700 | 81.54 |
| 29 | −35.537 | DD[29] | | |
| 30 | 197.695 | 6.02 | 1.58267 | 46.42 |
| 31 | −68.501 | 17.20 | | |
| 32 | ∞ | 25.11 | 1.51633 | 64.14 |
| 33 | ∞ | | | |

TABLE 8

Example 3

| | Surface Number | | | |
|---|---|---|---|---|
| | 1 | 2 | 3 | 4 |
| KA | -1.1947819E+00 | 2.4261754E+01 | 2.3078586E+00 | -1.1665785E+01 |
| A3 | 7.3342438E-18 | 1.1387367E-17 | -5.7977501E-20 | 7.7369870E-20 |
| A4 | 2.0552582E-05 | 3.5970828E-05 | 3.6731751E-05 | 2.7351779E-05 |
| A5 | 2.4995170E-06 | 2.1886571E-06 | 1.4610520E-06 | 1.2625028E-06 |
| A6 | -3.2360418E-07 | -2.4132488E-07 | -1.8375089E-07 | -1.5006075E-07 |
| A7 | 1.5383108E-08 | 4.6817539E-09 | -3.1670078E-09 | -6.4215327E-09 |
| A8 | -3.9287269E-10 | -1.6907311E-11 | 3.9590892E-10 | 6.1385799E-10 |
| A9 | 5.1946552E-12 | 4.1924161E-12 | 1.3363423E-12 | 8.3468376E-12 |
| A10 | -2.2290306E-15 | -1.7189297E-13 | -4.5044975E-13 | -1.2038421E-12 |
| A11 | -1.3550123E-15 | 2.9592857E-16 | 2.3364064E-15 | 8.7054545E-16 |
| A12 | 2.8545627E-17 | 6.6579111E-17 | 2.8047952E-16 | 1.1977959E-15 |
| A13 | -2.9055895E-19 | -4.5304405E-19 | -2.9693435E-18 | -9.4900026E-18 |
| A14 | 1.1890100E-21 | -1.4438207E-20 | -9.0197905E-20 | -5.9119376E-19 |
| A15 | 3.2824169E-24 | 1.3632477E-22 | 1.2740629E-21 | 6.9503149E-21 |
| A16 | -4.3204888E-26 | 1.4649829E-24 | 1.1710529E-23 | 1.1551196E-22 |
| A17 | 1.0824990E-28 | -1.6703812E-26 | -1.9364430E-25 | -1.5959462E-24 |

| | Surface Number | |
|---|---|---|
| | 20 | 21 |
| KA | 1.0000000E+00 | 1.0000000E+00 |
| A4 | -2.9272496E-06 | -6.5327756E-06 |
| A6 | -5.8748817E-09 | -2.5334678E-08 |
| A8 | 2.0448032E-10 | 1.8644726E-10 |
| A10 | -4.3782289E-14 | 3.7131924E-14 |
| A12 | -9.4555798E-16 | -1.3501983E-15 |
| A14 | -1.9525773E-21 | -2.3237313E-18 |
| A16 | 9.6353568E-25 | 6.9177523E-26 |
| A18 | 3.9895623E-30 | -1.0826643E-29 |

TABLE 9

Example 3

| | Projection Distance = ∞ | | Projection Distance = 2300 | |
|---|---|---|---|---|
| | WIDE | TELE | WIDE | TELE |
| Zr | 1.0 | 1.25 | 1.0 | 1.25 |
| f | 10.00 | 12.50 | | |
| Bf | 33.76 | 33.76 | | |
| FNo. | 1.89 | 2.03 | 1.89 | 2.03 |
| 2ω[°] | 105.8 | 93.0 | 104.0 | 90.8 |
| DD[6] | 24.30 | 24.30 | 19.79 | 19.79 |
| DD[11] | 14.93 | 4.69 | 16.52 | 6.28 |
| DD[13] | 17.69 | 26.70 | 17.69 | 26.70 |
| DD[17] | 22.02 | 4.15 | 22.02 | 4.15 |
| DD[19] | 8.95 | 20.51 | 8.95 | 20.51 |
| DD[29] | 0.30 | 7.84 | 0.30 | 7.84 |

Example 4

Figure 12:
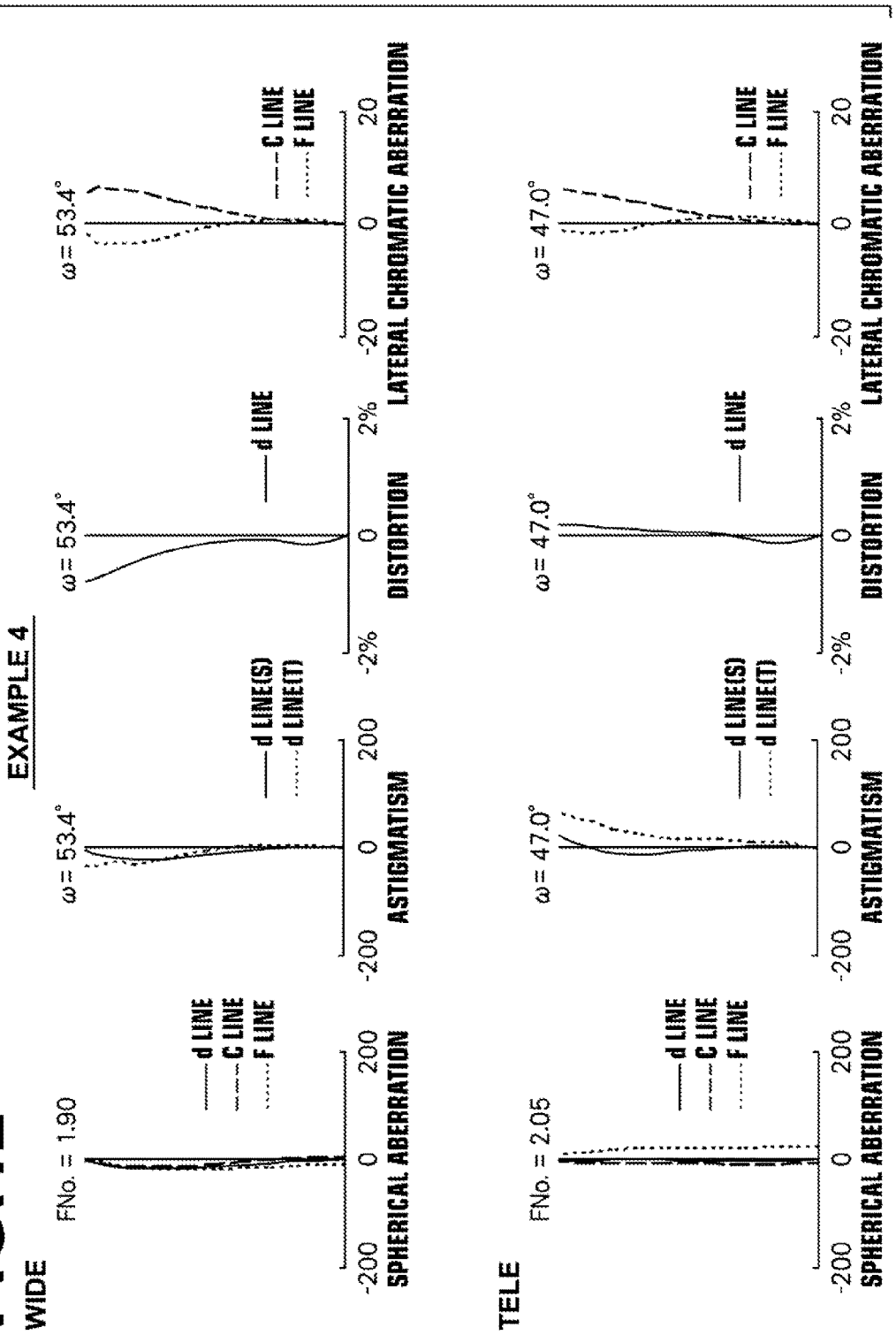
FIG. 12 is a collection of diagrams that illustrate aberrations of the projection zoom lens according to Example 4, the diagrams illustrating spherical aberration, astigmatism, distortion, and lateral chromatic aberrations in this order from the left side of the drawing sheet.

The lens configuration of the projection zoom lens of Example 4 is illustrated in FIG. 4. In the projection zoom lens of Example 4, the movements of each lens group of the projection zoom lens when changing magnification from the wide angle end to the telephoto end are the same as those of Example 3 described above. Basic lens data are shown in Table 10, aspherical surface coefficients are shown in Table 11, and the values of various items and the variable distances between surfaces are shown in Table 12 for the projection zoom lens of Example 4. The spherical aberration, the astigmatism, the distortion, the lateral chromatic aberration of the projection zoom lens of Example 4 for a case in which the projection distance is 2300 are illustrated in aberration diagrams in order from the left to the right of FIG. 12.

TABLE 10

Example 4

| Si | Ri | Di | Ndj | νdj |
|---|---|---|---|---|
| *1 | -51.473 | 6.91 | 1.49100 | 57.56 |
| *2 | -364.124 | 0.99 | | |
| *3 | 90.990 | 5.76 | 1.49100 | 57.56 |
| *4 | 97.838 | 16.19 | | |
| 5 | 1006.495 | 2.62 | 1.79952 | 42.22 |
| 6 | 28.321 | DD[6] | | |
| 7 | -85.200 | 2.62 | 1.60311 | 60.64 |
| 8 | 98.071 | 7.85 | | |
| 9 | -160.085 | 2.10 | 1.58913 | 61.14 |
| 10 | 56.118 | 9.76 | 1.51823 | 58.90 |
| 11 | -130.056 | DD[11] | | |
| 12 | 90.048 | 8.38 | 1.80400 | 46.58 |
| 13 | -111.405 | DD[13] | | |
| 14 | 88.551 | 5.24 | 1.64769 | 33.79 |
| 15 | -3657.977 | 3.12 | | |
| 16 | -74.580 | 1.57 | 1.72000 | 41.98 |
| 17 | -484.105 | DD[17] | | |
| 18 | 53.058 | 4.72 | 1.49700 | 81.54 |
| 19 | -578.207 | DD[19] | | |
| *20 | 64.603 | 2.14 | 1.80139 | 45.45 |
| *21 | 25.779 | 2.04 | | |
| 22 | 38.791 | 9.98 | 1.49700 | 81.54 |
| 23 | -15.962 | 2.10 | 1.80400 | 46.58 |
| 24 | -73.070 | 1.05 | | |
| 25 | -77.080 | 2.63 | 1.80610 | 40.92 |
| 26 | 42.638 | 6.64 | 1.49700 | 81.54 |
| 27 | -52.052 | 0.45 | | |
| 28 | 98.893 | 8.38 | 1.49700 | 81.54 |
| 29 | -32.873 | DD[29] | | |
| 30 | 102.241 | 6.28 | 1.58913 | 61.14 |
| 31 | -85.197 | 10.63 | | |
| 32 | ∞ | 36.66 | 1.51633 | 64.14 |
| 33 | ∞ | | | |

TABLE 11

Example 4

| | Surface Number | | | |
|---|---|---|---|---|
| | 1 | 2 | 3 | 4 |
| KA | −1.5788085E+00 | 3.8241651E+01 | 2.9403772E+00 | −9.0358134E+00 |
| A3 | −3.7908092E−17 | 7.8715209E−18 | 9.2608239E−20 | −7.9983849E−20 |
| A4 | 1.3385121E−05 | 1.1690013E−05 | 9.5503406E−06 | 1.7703753E−05 |
| A5 | 2.0294438E−06 | 1.6252750E−06 | 1.0586224E−06 | 8.4788108E−07 |
| A6 | −2.2821554E−07 | −1.0799891E−07 | −8.6400372E−08 | −1.2464529E−07 |
| A7 | 1.0203636E−08 | 1.7627330E−09 | −1.3746911E−09 | −2.0240557E−09 |
| A8 | −2.5051835E−10 | −2.4591751E−11 | 1.9017350E−10 | 4.4101474E−10 |
| A9 | 3.1507954E−12 | 2.0697909E−12 | −3.1569690E−13 | −1.9502578E−12 |
| A10 | 3.5181873E−16 | −5.5264322E−14 | −1.9497158E−13 | −7.1333088E−13 |
| A11 | −7.3306154E−16 | −7.4042037E−17 | 1.8895695E−15 | 1.0333916E−14 |
| A12 | 1.3337439E−17 | 1.8845627E−17 | 1.0417912E−16 | 5.8608071E−16 |
| A13 | −1.2674202E−19 | −9.1310019E−20 | −1.5142925E−18 | −1.1864215E−17 |
| A14 | 6.6761992E−22 | −3.5993600E−21 | −2.8128666E−20 | −2.3957875E−19 |
| A15 | −2.1608122E−25 | 2.9973181E−23 | 5.0399618E−22 | 5.6996486E−21 |
| A16 | −2.9702118E−26 | 3.1362766E−25 | 3.0368009E−24 | 3.8746625E−23 |
| A17 | 1.8148001E−28 | −3.3946983E−27 | −6.2144585E−26 | −1.0099483E−24 |

| | Surface Number | |
|---|---|---|
| | 20 | 21 |
| KA | 1.0000000E+00 | 1.0000000E+00 |
| A4 | −2.5808895E−06 | −5.7597999E−06 |
| A6 | −4.7626487E−09 | −2.0538315E−08 |
| A8 | 1.5241956E−10 | 1.3897772E−10 |
| A10 | −3.0007334E−14 | 2.5449333E−14 |
| A12 | −5.9587736E−16 | −8.5087601E−16 |
| A14 | −1.1314014E−21 | −1.3464629E−18 |
| A16 | 5.1335295E−25 | 3.6856430E−26 |
| A18 | 1.9543992E−30 | −5.3037352E−30 |

TABLE 12

Example 4

| | Projection Distance = ∞ | | Projection Distance = 2300 | |
|---|---|---|---|---|
| | WIDE | TELE | WIDE | TELE |
| Zr | 1.0 | 1.25 | 1.0 | 1.25 |
| f | 10.00 | 12.50 | | |
| Bf | 34.80 | 34.80 | | |
| FNo. | 1.90 | 2.05 | 1.90 | 2.05 |
| 2ω [°] | 108.2 | 95.4 | 107.0 | 94.0 |
| DD[6] | 26.08 | 26.08 | 22.99 | 22.99 |
| DD[11] | 16.85 | 7.92 | 17.97 | 9.04 |
| DD[13] | 15.69 | 22.93 | 15.69 | 22.93 |
| DD[17] | 22.29 | 2.41 | 22.29 | 2.41 |
| DD[19] | 10.86 | 23.70 | 10.86 | 23.70 |
| DD[29] | 0.31 | 9.04 | 0.31 | 9.04 |

Example 5

Figure 13:
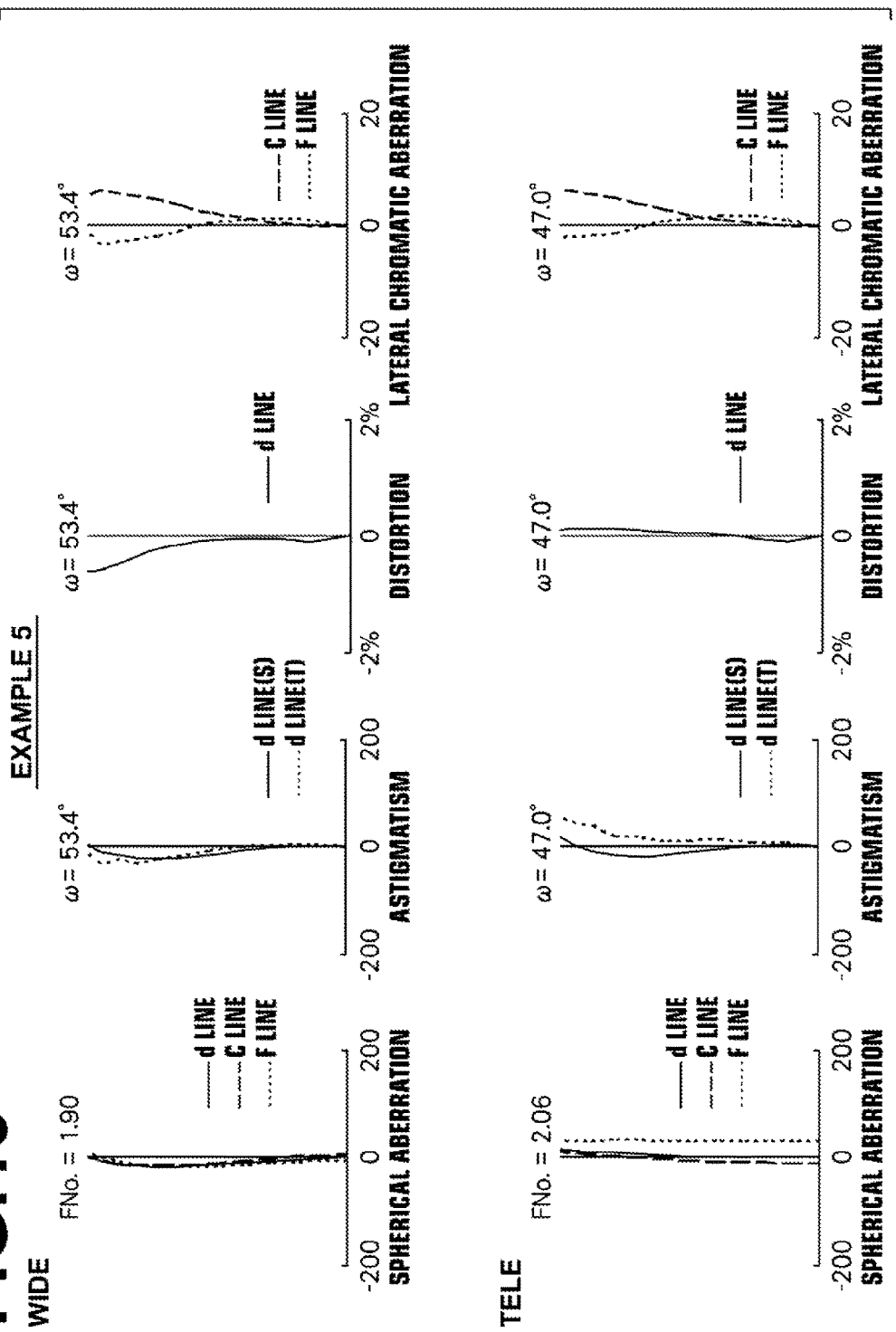
FIG. 13 is a collection of diagrams that illustrate aberrations of the projection zoom lens according to Example 5, the diagrams illustrating spherical aberration, astigmatism, distortion, and lateral chromatic aberrations in this order from the left side of the drawing sheet.

The lens configuration of the projection zoom lens of Example 5 is illustrated in FIG. 5. In the projection zoom lens of Example 5, the movements of each lens group of the projection zoom lens when changing magnification from the wide angle end to the telephoto end are the same as those of Example 1 illustrated in FIG. 1. Basic lens data are shown in Table 13, aspherical surface coefficients are shown in Table 14, and the values of various items and the variable distances between surfaces are shown in Table 15 for the projection zoom lens of Example 5. The spherical aberration, the astigmatism, the distortion, the lateral chromatic aberration of the projection zoom lens of Example 5 for a case in which the projection distance is 2300 are illustrated in aberration diagrams in order from the left to the right of FIG. 13.

TABLE 13

Example 5

| Si | Ri | Di | Ndj | νdj |
|---|---|---|---|---|
| *1 | −49.306 | 6.88 | 1.49100 | 57.56 |
| *2 | −377.175 | 0.31 | | |
| *3 | 93.173 | 5.73 | 1.49100 | 57.56 |
| *4 | 97.503 | 15.35 | | |
| 5 | 758.882 | 2.60 | 1.80610 | 40.92 |
| 6 | 28.573 | DD[6] | | |
| 7 | −89.139 | 3.21 | 1.60311 | 60.64 |
| 8 | 98.177 | 7.32 | | |
| 9 | −148.344 | 2.39 | 1.58913 | 61.14 |
| 10 | 53.418 | 9.72 | 1.51742 | 52.43 |
| 11 | −128.522 | DD[11] | | |
| 12 | 89.485 | 8.91 | 1.80400 | 46.58 |
| 13 | −110.313 | DD[13] | | |
| 14 | 85.877 | 5.23 | 1.63980 | 34.46 |
| 15 | 20531.581 | 3.30 | | |
| 16 | −74.032 | 1.99 | 1.72000 | 41.98 |
| 17 | −591.012 | DD[17] | | |
| 18 | 49.297 | 4.75 | 1.49700 | 81.54 |
| 19 | −652.466 | DD[19] | | |
| *20 | 64.553 | 1.89 | 1.80139 | 45.45 |
| *21 | 25.503 | 1.58 | | |
| 22 | 39.317 | 11.37 | 1.49700 | 81.54 |
| 23 | −15.637 | 2.08 | 1.80400 | 46.58 |
| 24 | −76.937 | 1.04 | | |
| 25 | −83.901 | 2.61 | 1.80610 | 40.92 |
| 26 | 42.557 | 6.32 | 1.49700 | 81.54 |
| 27 | −52.884 | 0.31 | | |
| 28 | 98.544 | 8.70 | 1.49700 | 81.54 |
| 29 | −32.310 | DD[29] | | |
| 30 | 99.851 | 6.25 | 1.58913 | 61.14 |

TABLE 13-continued

Example 5

| Si | Ri | Di | Ndj | vdj |
|---|---|---|---|---|
| 31 | −81.455 | 10.57 | | |
| 32 | ∞ | 36.46 | 1.51633 | 64.14 |
| 33 | ∞ | | | |

TABLE 14

Example 5

Surface Number

| | 1 | 2 | 3 | 4 |
|---|---|---|---|---|
| KA | −3.4711432E+00 | 3.8187655E+01 | 3.0605228E+00 | −9.9561112E+00 |
| A3 | 2.5764711E−18 | 1.4000753E−17 | 0.0000000E+00 | −1.5485667E−19 |
| A4 | 1.6092867E−05 | 1.4739662E−05 | 9.3509256E−06 | 1.8812117E−05 |
| A5 | 1.8633803E−06 | 1.6999016E−06 | 9.6450533E−07 | 5.6933513E−07 |
| A6 | −2.2858461E−07 | −1.0877226E−07 | −8.8982689E−08 | −1.4040920E−07 |
| A7 | 1.0314678E−08 | 7.8975403E−10 | −1.2177178E−09 | −1.2034138E−10 |
| A8 | −2.4756844E−10 | 1.3170157E−11 | 1.9432240E−10 | 4.6362327E−10 |
| A9 | 2.9714934E−12 | 1.9756114E−12 | −2.8258722E−13 | −6.4651273E−12 |
| A10 | 7.2288820E−16 | −6.5456182E−14 | −1.9657534E−13 | −7.0571657E−13 |
| A11 | −6.6504659E−16 | −1.5050964E−16 | 1.6622432E−15 | 1.5897365E−14 |
| A12 | 1.2946853E−17 | 2.3232216E−17 | 1.0352206E−16 | 5.5252166E−16 |
| A13 | −1.3945295E−19 | −7.5436428E−20 | −1.3247801E−18 | −1.5574958E−17 |
| A14 | 7.0543715E−22 | −4.4377295E−21 | −2.7532322E−20 | −2.1744443E−19 |
| A15 | 1.7276031E−24 | 2.8727780E−23 | 4.3866477E−22 | 6.9511255E−21 |
| A16 | −3.2715219E−26 | 3.6201454E−25 | 2.9263430E−24 | 3.4115455E−23 |
| A17 | 6.3199645E−29 | −3.1738127E−27 | −5.3818255E−26 | −1.1750605E−24 |

Surface Number

| | 20 | 21 |
|---|---|---|
| KA | 1.0000000E+00 | 1.0000000E+00 |
| A4 | −2.6293345E−06 | −5.8321203E−06 |
| A6 | −4.9793148E−09 | −2.1078770E−08 |
| A8 | 1.5876122E−10 | 1.4399104E−10 |
| A10 | −3.1579186E−14 | 2.6698530E−14 |
| A12 | −6.2988774E−16 | −9.0001074E−16 |
| A14 | 3.5257466E−20 | −1.5440358E−18 |
| A16 | 5.5636747E−25 | 3.8230243E−26 |
| A18 | 2.1410084E−30 | −5.8101444E−30 |

TABLE 15

Example 5

| | Projection Distance = ∞ | | Projection Distance = 2300 | |
|---|---|---|---|---|
| | WIDE | TELE | WIDE | TELE |
| Zr | 1.0 | 1.25 | 1.0 | 1.25 |
| f | 10.00 | 12.50 | | |
| Bf | 34.62 | 34.62 | | |
| FNo. | 1.90 | 2.06 | 1.90 | 2.06 |
| 2ω [°] | 107.8 | 95.2 | 106.8 | 94.0 |
| DD[6] | 25.07 | 25.07 | 22.73 | 22.73 |
| DD[11] | 16.52 | 7.95 | 17.39 | 8.82 |
| DD[13] | 15.42 | 21.88 | 15.42 | 21.88 |
| DD[17] | 21.19 | 2.39 | 21.19 | 2.39 |
| DD[19] | 11.27 | 22.82 | 11.27 | 22.82 |
| DD[29] | 0.35 | 9.71 | 0.35 | 9.71 |

Example 6

Figure 14:
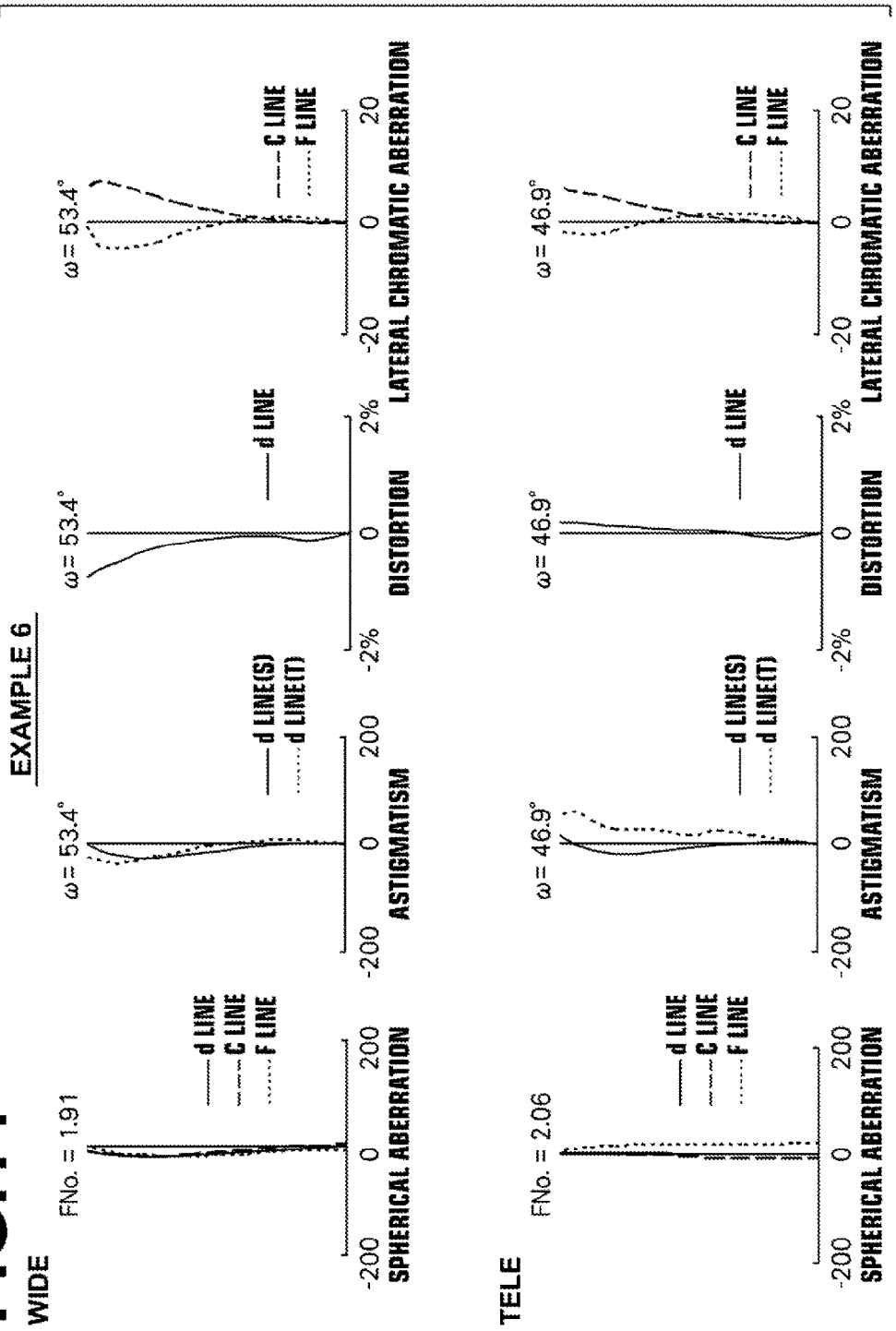
FIG. 14 is a collection of diagrams that illustrate aberrations of the projection zoom lens according to Example 6, the diagrams illustrating spherical aberration, astigmatism, distortion, and lateral chromatic aberrations in this order from the left side of the drawing sheet.

The lens configuration of the projection zoom lens of Example 6 is illustrated in FIG. 6. In the projection zoom lens of Example 6, the movements of each lens group of the projection zoom lens when changing magnification from the wide angle end to the telephoto end are the same as those of Example 1 illustrated in FIG. 1. Basic lens data are shown in Table 16, aspherical surface coefficients are shown in Table 17, and the values of various items and the variable distances between surfaces are shown in Table 18 for the projection zoom lens of Example 6. The spherical aberration, the astigmatism, the distortion, the lateral chromatic aberration of the projection zoom lens of Example 6 for a case in which the projection distance is 2300 are illustrated in aberration diagrams in order from the left to the right of FIG. 14.

TABLE 16

Example 6

| Si | Ri | Di | Ndj | vdj |
|---|---|---|---|---|
| *1 | −48.127 | 6.87 | 1.51007 | 56.24 |
| *2 | −357.511 | 0.31 | | |
| *3 | 99.068 | 5.73 | 1.51007 | 56.24 |
| *4 | 104.918 | 15.51 | | |
| 5 | 766.372 | 2.60 | 1.80610 | 40.92 |
| 6 | 28.813 | DD[6] | | |
| 7 | −89.074 | 3.24 | 1.61104 | 60.73 |
| 8 | 103.240 | 7.81 | | |
| 9 | −153.133 | 2.61 | 1.58698 | 61.65 |
| 10 | 54.213 | 9.88 | 1.51742 | 52.43 |
| 11 | −114.963 | DD[11] | | |
| 12 | 89.690 | 8.33 | 1.80400 | 46.58 |
| 13 | −111.322 | DD[13] | | |
| 14 | 86.888 | 5.52 | 1.59270 | 35.31 |
| 15 | −3116.030 | 1.99 | | |
| 16 | −76.741 | 1.61 | 1.73041 | 43.91 |
| 17 | −627.376 | DD[17] | | |

TABLE 16-continued

Example 6

| Si | Ri | Di | Ndj | vdj |
|---|---|---|---|---|
| 18 | 47.832 | 4.69 | 1.49700 | 81.54 |
| 19 | −1155.823 | DD[19] | | |
| *20 | 62.617 | 1.91 | 1.80139 | 45.45 |
| *21 | 25.550 | 1.56 | | |
| 22 | 40.245 | 11.54 | 1.49700 | 81.54 |
| 23 | −15.615 | 2.08 | 1.80400 | 46.58 |
| 24 | −79.778 | 1.09 | | |
| 25 | −89.371 | 2.61 | 1.80610 | 40.92 |
| 26 | 43.611 | 6.25 | 1.49700 | 81.54 |
| 27 | −55.149 | 0.31 | | |
| 28 | 104.013 | 8.33 | 1.49700 | 81.54 |
| 29 | −32.424 | DD[29] | | |
| 30 | 99.672 | 6.25 | 1.58596 | 61.60 |
| 31 | −76.968 | 10.56 | | |
| 32 | ∞ | 36.44 | 1.51633 | 64.14 |
| 33 | ∞ | | | |

TABLE 17

Example 6

| | Surface Number | | | |
|---|---|---|---|---|
| | 1 | 2 | 3 | 4 |
| KA | −5.7748532E+00 | 4.0030222E+01 | 1.5783416E+00 | −1.1296999E+01 |
| A3 | −1.8322705E−17 | −2.3783935E−18 | 8.5949596E−20 | 0.0000000E+00 |
| A4 | 1.2059863E−05 | 2.7300228E−05 | 2.5877695E−05 | 2.2321497E−05 |
| A5 | 2.1518286E−06 | 8.4659426E−07 | 4.7591191E−07 | 9.7779369E−07 |
| A6 | −2.4333625E−07 | −9.7425393E−08 | −1.4140458E−07 | −1.8027660E−07 |
| A7 | 1.0861450E−08 | 9.3444082E−10 | 1.7761274E−09 | −5.1867668E−10 |
| A8 | −2.6144817E−10 | 4.5338660E−11 | 2.1069254E−10 | 5.5880453E−10 |
| A9 | 3.2671597E−12 | 1.5992718E−13 | −4.5170392E−12 | −7.0572641E−12 |
| A10 | −3.3090866E−15 | −4.6594435E−14 | −1.6224247E−13 | −8.1619680E−13 |
| A11 | −7.1507172E−16 | 3.5341163E−16 | 4.6362705E−15 | 1.6607995E−14 |
| A12 | 1.5824141E−17 | 1.3835312E−17 | 7.0115155E−17 | 6.2073444E−16 |
| A13 | −1.7059592E−19 | −1.5156299E−19 | −2.4931395E−18 | −1.5200462E−17 |
| A14 | 6.0812988E−22 | −2.1620143E−21 | −1.6115119E−20 | −2.3879300E−19 |
| A15 | 4.2875601E−24 | 2.7788901E−23 | 6.8726588E−22 | 6.3379461E−21 |
| A16 | −2.5885907E−26 | 1.4033469E−25 | 1.5383995E−24 | 3.6746064E−23 |
| A17 | −7.5847582E−29 | −1.9688670E−27 | −7.6264090E−26 | −1.0036214E−24 |

| | Surface Number | |
|---|---|---|
| | 20 | 21 |
| KA | 1.0000000E+00 | 1.0000000E+00 |
| A4 | −2.6335122E−06 | −5.8413870E−06 |
| A6 | −4.9925079E−09 | −2.1134619E−08 |
| A8 | 1.5935044E−10 | 1.4452544E−10 |
| A10 | −3.1729954E−14 | 2.6825997E−14 |
| A12 | −6.3356523E−16 | −9.0526529E−16 |
| A14 | 3.5500866E−20 | −1.5546950E−18 |
| A16 | 5.6080160E−25 | 3.8534930E−26 |
| A18 | 2.1603571E−30 | −5.8626518E−30 |

TABLE 18

Example 6

| | Projection Distance = ∞ | | Projection Distance = 2300 | |
|---|---|---|---|---|
| | WIDE | TELE | WIDE | TELE |
| Zr | 1.0 | 1.25 | 1.0 | 1.25 |
| f | 10.00 | 12.50 | | |
| Bf | 34.60 | 34.60 | | |
| FNo. | 1.91 | 2.06 | 1.91 | 2.06 |
| 2ω [°] | 108.0 | 95.0 | 106.8 | 93.8 |
| DD[6] | 23.96 | 23.96 | 21.43 | 21.43 |
| DD[11] | 16.57 | 7.77 | 17.59 | 8.79 |
| DD[13] | 16.00 | 23.21 | 16.00 | 23.21 |
| DD[17] | 23.28 | 4.39 | 23.28 | 4.39 |
| DD[19] | 10.81 | 22.24 | 10.81 | 22.24 |
| DD[29] | 0.31 | 9.36 | 0.31 | 9.36 |

Example 7

Figure 15:
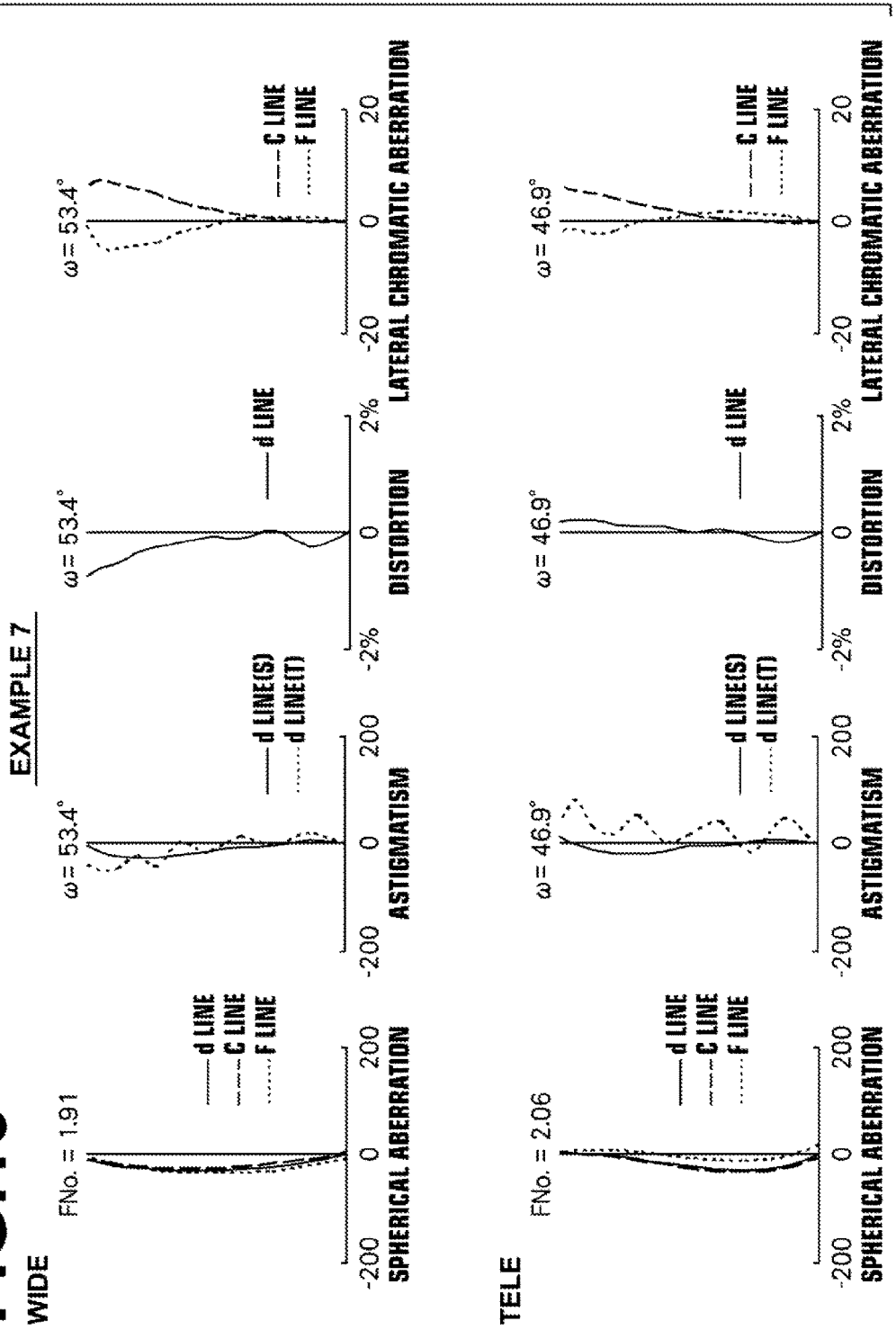
FIG. 15 is a collection of diagrams that illustrate aberrations of the projection zoom lens according to Example 7, the diagrams illustrating spherical aberration, astigmatism, distortion, and lateral chromatic aberrations in this order from the left side of the drawing sheet.

The lens configuration of the projection zoom lens of Example 7 is illustrated in FIG. 7. In the projection zoom lens of Example 7, the movements of each lens group of the projection zoom lens when changing magnification from the wide angle end to the telephoto end are the same as those of Example 1 illustrated in FIG. 1. Basic lens data are shown in Table 19, aspherical surface coefficients are shown in Table 20, and the values of various items and the variable distances between surfaces are shown in Table 21 for the projection zoom lens of Example 7. The spherical aberration, the astigmatism, the distortion, the lateral chromatic aberration of the projection zoom lens of Example 7 for a case in which the projection distance is 2300 are illustrated in aberration diagrams in order from the left to the right of FIG. 15.

TABLE 19

Example 7

| Si | Ri | Di | Ndj | vdj |
|---|---|---|---|---|
| *1 | −47.797 | 6.88 | 1.51007 | 56.24 |
| *2 | −360.779 | 0.31 | | |
| *3 | 98.997 | 5.73 | 1.51007 | 56.24 |
| *4 | 104.994 | 15.66 | | |
| 5 | 821.238 | 2.60 | 1.80610 | 40.92 |
| 6 | 29.015 | DD[6] | | |
| 7 | −91.499 | 2.60 | 1.62041 | 60.29 |
| 8 | 105.174 | 7.81 | | |
| 9 | −144.634 | 2.62 | 1.58913 | 61.14 |
| 10 | 54.268 | 9.46 | 1.51742 | 52.43 |
| 11 | −107.967 | DD[11] | | |
| 12 | 89.308 | 8.33 | 1.80400 | 46.58 |
| 13 | −113.189 | DD[13] | | |
| 14 | 85.175 | 5.21 | 1.59270 | 35.31 |
| 15 | −4004.111 | 1.93 | | |
| 16 | −77.111 | 1.56 | 1.72000 | 43.69 |
| 17 | −763.167 | DD[17] | | |
| 18 | 48.387 | 4.70 | 1.49700 | 81.54 |
| 19 | −1185.853 | DD[19] | | |
| *20 | 62.554 | 1.83 | 1.80139 | 45.45 |
| *21 | 25.602 | 1.56 | | |
| 22 | 40.475 | 11.80 | 1.49700 | 81.54 |
| 23 | −15.614 | 2.08 | 1.80400 | 46.58 |
| 24 | −79.594 | 1.04 | | |
| 25 | −90.122 | 2.61 | 1.80610 | 40.92 |
| 26 | 43.626 | 6.23 | 1.49700 | 81.54 |
| 27 | −56.219 | 0.31 | | |
| 28 | 104.432 | 8.34 | 1.49700 | 81.54 |
| 29 | −32.187 | DD[29] | | |
| 30 | 99.072 | 6.25 | 1.58913 | 61.14 |
| 31 | −78.333 | 10.57 | | |
| 32 | ∞ | 36.46 | 1.51633 | 64.14 |
| 33 | ∞ | | | |

TABLE 20

Example 7

Surface Number

| | 1 | 2 | 3 | 4 |
|---|---|---|---|---|
| KA | −5.7205050E+00 | 3.7739019E+01 | 1.5871939E+00 | −1.0465661E+01 |
| A3 | −2.2347568E−05 | −4.1667529E−06 | 1.1475538E−05 | −2.5375929E−04 |
| A4 | 2.1054821E−05 | 2.9685108E−05 | 2.1164200E−05 | 1.7436215E−04 |
| A5 | 6.2845174E−07 | 3.0180641E−07 | 1.4035884E−06 | −3.5682597E−05 |
| A6 | −1.0187189E−07 | −3.0286543E−08 | −2.3587466E−07 | 4.4677624E−06 |
| A7 | 2.8922009E−09 | −4.1555912E−09 | 6.8234213E−09 | −3.2899745E−07 |
| A8 | 1.6275591E−11 | 2.9200302E−10 | 1.1049335E−10 | 1.2159487E−08 |
| A9 | −2.2565796E−12 | −7.2815306E−12 | −7.5709583E−12 | −4.2273442E−11 |
| A10 | 3.0239471E−14 | 7.3722311E−14 | 3.7470335E−14 | −1.2881328E−11 |
| A11 | 4.5327805E−16 | 7.8287202E−17 | 2.1864546E−15 | 3.2621063E−13 |
| A12 | −1.6571037E−17 | −5.1536344E−18 | 2.5004557E−17 | 4.8745824E−15 |
| A13 | 1.3969696E−19 | −2.7874837E−19 | −2.9115615E−18 | −2.9521250E−16 |
| A14 | 7.7664480E−22 | 1.4596603E−20 | 9.1247551E−20 | 1.0819246E−18 |
| A15 | −2.5424484E−23 | −3.0470883E−22 | −2.3067199E−21 | 1.2894984E−19 |
| A16 | 2.1867047E−25 | 3.0558221E−24 | 3.6632084E−23 | −2.5202379E−21 |
| A17 | −7.4379656E−28 | −1.2008797E−26 | −2.3328289E−25 | 1.4876960E−23 |

Surface Number

| | 20 | 21 |
|---|---|---|
| KA | 1.0000000E+00 | 1.0000000E+00 |
| A4 | −2.6283420E−06 | −5.8299188E−06 |
| A6 | −4.9761826E−09 | −2.1065510E−08 |
| A8 | 1.5862142E−10 | 1.4386424E−10 |
| A10 | −3.1543438E−14 | 2.6668307E−14 |
| A12 | −6.2901635E−16 | −8.9876567E−16 |
| A14 | 3.5199830E−20 | −1.5415117E−18 |
| A16 | 5.5531817E−25 | 3.8158141E−26 |
| A18 | 2.1364327E−30 | −5.7977270E−30 |

TABLE 21

Example 7

| | Projection Distance = ∞ | | Projection Distance = 2300 | |
|---|---|---|---|---|
| | WIDE | TELE | WIDE | TELE |
| Zr | 1.0 | 1.25 | 1.0 | 1.25 |
| f′ | 10.00 | 12.50 | | |
| Bf | 34.62 | 34.62 | | |
| FNo. | 1.91 | 2.06 | 1.91 | 2.06 |
| 2ω [°] | 108.0 | 95.0 | 106.8 | 93.8 |
| DD[6] | 23.62 | 23.62 | 20.93 | 20.93 |
| DD[11] | 17.90 | 8.85 | 19.00 | 9.95 |
| DD[13] | 16.41 | 23.55 | 16.41 | 23.55 |
| DD[17] | 23.59 | 4.88 | 23.59 | 4.88 |
| DD[19] | 10.50 | 22.12 | 10.50 | 22.12 |
| DD[29] | 0.31 | 9.31 | 0.31 | 9.31 |

Example 8

Figure 16:
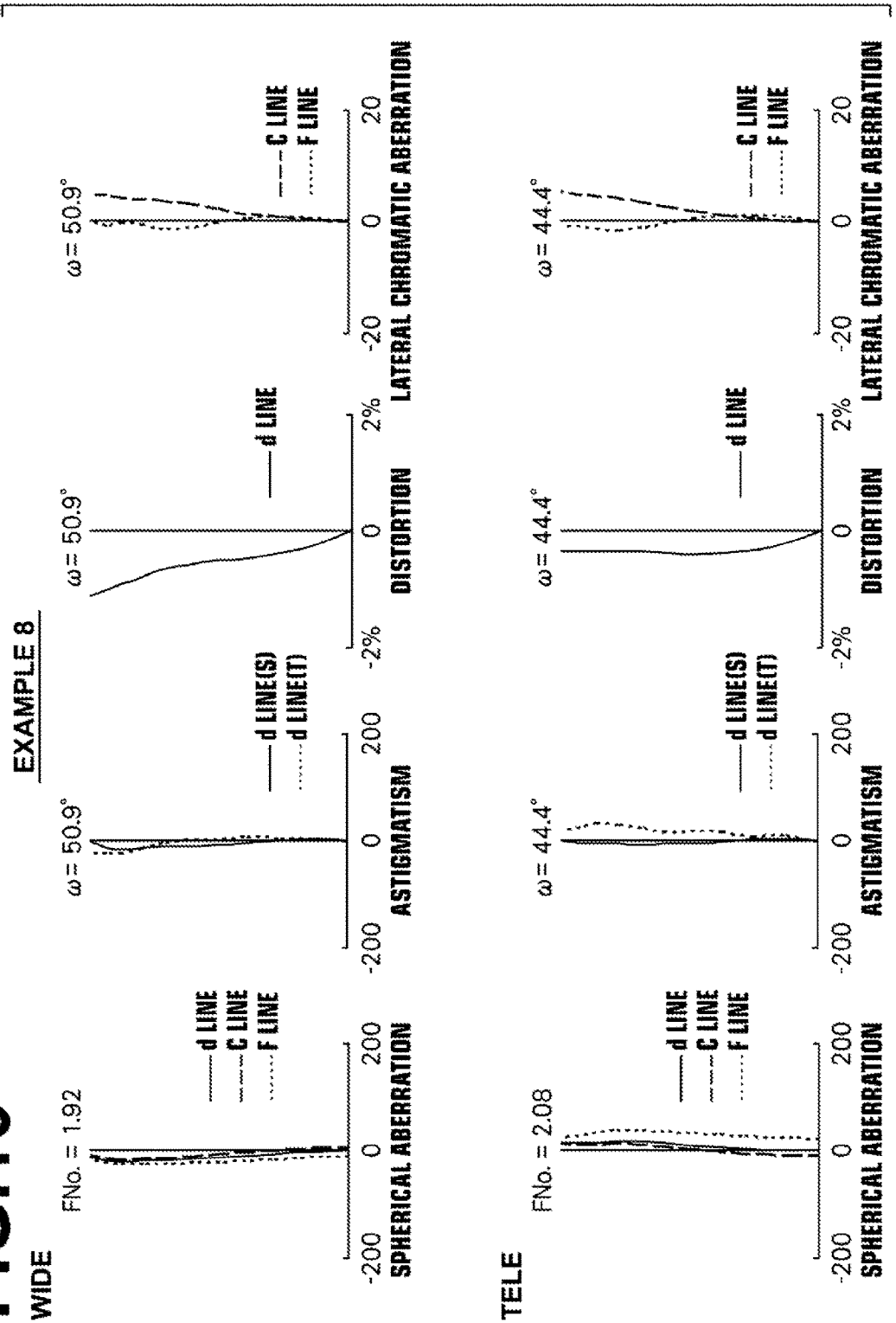
FIG. 16 is a collection of diagrams that illustrate aberrations of the projection zoom lens according to Example 8, the diagrams illustrating spherical aberration, astigmatism, distortion, and lateral chromatic aberrations in this order from the left side of the drawing sheet.

The lens configuration of the projection zoom lens of Example 8 is illustrated in FIG. 8. In the projection zoom lens of Example 8, the movements of each lens group of the projection zoom lens when changing magnification from the wide angle end to the telephoto end are the same as those of Example 1 illustrated in FIG. 1. Basic lens data are shown in Table 22, aspherical surface coefficients are shown in Table 23, and the values of various items and the variable distances between surfaces are shown in Table 24 for the projection zoom lens of Example 8. The spherical aberration, the astigmatism, the distortion, the lateral chromatic aberration of the projection zoom lens of Example 8 for a case in which the projection distance is 2300 are illustrated in aberration diagrams in order from the left to the right of FIG. 16.

TABLE 22

Example 8

| Si | Ri | Di | Ndj | vdj |
|---|---|---|---|---|
| *1 | −44.115 | 6.39 | 1.49100 | 57.56 |
| *2 | −289.776 | 2.45 | | |
| *3 | 87.814 | 5.40 | 1.49100 | 57.56 |
| *4 | 97.035 | 12.08 | | |
| 5 | 1139.310 | 2.46 | 1.79952 | 42.22 |
| 6 | 26.717 | DD[6] | | |
| 7 | −77.907 | 3.59 | 1.58913 | 61.13 |
| 8 | 70.317 | 6.99 | | |
| 9 | 507.225 | 8.95 | 1.56732 | 42.82 |
| 10 | −47.788 | 2.33 | 1.58913 | 61.13 |
| 11 | −37035.054 | DD[11] | | |
| 12 | 86.907 | 8.16 | 1.80400 | 46.58 |
| 13 | −104.088 | DD[13] | | |
| 14 | 87.370 | 5.09 | 1.80610 | 33.27 |
| 15 | 1696.701 | 3.82 | | |
| 16 | −65.881 | 1.47 | 1.80100 | 34.97 |
| 17 | −332.960 | DD[17] | | |
| 18 | 47.446 | 5.73 | 1.49700 | 81.54 |
| 19 | −199.871 | DD[19] | | |
| *20 | 56.588 | 1.73 | 1.80610 | 40.93 |
| *21 | 24.298 | 1.58 | | |
| 22 | 34.032 | 10.79 | 1.49700 | 81.54 |
| 23 | −15.277 | 1.96 | 1.80400 | 46.58 |
| 24 | −78.838 | 0.98 | | |
| 25 | −82.313 | 2.56 | 1.80400 | 46.58 |
| 26 | 40.945 | 6.28 | 1.49700 | 81.54 |
| 27 | −44.576 | 0.29 | | |
| 28 | 82.655 | 8.76 | 1.49700 | 81.54 |
| 29 | −34.833 | DD[29] | | |
| 30 | 238.184 | 5.89 | 1.57099 | 50.80 |
| 31 | −65.101 | 17.30 | | |
| 32 | ∞ | 24.56 | 1.51633 | 64.14 |
| 33 | ∞ | | | |

TABLE 23

Example 8

| | Surface Number | | | |
|---|---|---|---|---|
| | 1 | 2 | 3 | 4 |
| KA | −1.1386138E+00 | 2.0105506E+01 | 3.8679534E+00 | 5.6811732E+00 |
| A3 | 1.5787236E−17 | 9.6026427E−18 | 0.0000000E+00 | 6.9350545E−20 |
| A4 | 2.1795372E−05 | 3.7840197E−05 | 2.9625820E−05 | 2.0498430E−05 |
| A5 | 4.1616684E−06 | 4.4618104E−06 | 3.7095851E−06 | 2.0205124E−06 |
| A6 | −5.3634947E−07 | −4.4225100E−07 | −3.0302682E−07 | −1.6694176E−07 |
| A7 | 2.7512914E−08 | 8.9136052E−09 | −1.1566986E−08 | −1.3315496E−08 |
| A8 | −7.9154444E−10 | −9.3816195E−11 | 9.9035287E−10 | 9.6296953E−10 |
| A9 | 1.2655301E−11 | 1.5294993E−11 | 1.1285323E−11 | 2.7089410E−11 |
| A10 | −2.9133205E−14 | −5.7144337E−13 | −1.5931024E−12 | −2.4270243E−12 |
| A11 | −4.1010650E−15 | −6.7935265E−16 | 2.9189529E−15 | −1.8722421E−14 |
| A12 | 1.0384394E−16 | 2.9860567E−16 | 1.3606660E−15 | 3.0204589E−15 |
| A13 | −1.0082092E−18 | −1.6336686E−18 | −1.2669203E−17 | −4.1536775E−18 |
| A14 | 2.5845927E−22 | −8.6962100E−20 | −5.9062919E−19 | −1.8475269E−18 |
| A15 | 4.0739120E−23 | 7.8627258E−22 | 8.2196738E−21 | 1.0396130E−20 |
| A16 | 2.6762094E−25 | 1.1757168E−23 | 1.0252433E−22 | 4.4601992E−22 |
| A17 | −3.9718364E−27 | −1.3855471E−25 | −1.7365140E−24 | −3.3391728E−24 |

| | Surface Number | |
|---|---|---|
| | 20 | 21 |
| KA | 1.0000000E+00 | 1.0000000E+00 |
| A4 | −3.1279278E−06 | −6.9806314E−06 |
| A6 | −6.5613630E−09 | −2.8295041E−08 |
| A8 | 2.3869561E−10 | 2.1764511E−10 |
| A10 | −5.3418211E−14 | 4.5304186E−14 |
| A12 | −1.2058048E−15 | −1.7218147E−15 |
| A14 | −2.6025259E−21 | −3.0972248E−18 |
| A16 | 1.3423093E−24 | 9.6371765E−26 |
| A18 | 5.8090890E−30 | −1.5764369E−29 |

TABLE 24

Example 8

| | Projection Distance = ∞ | | Projection Distance = 2300 | |
|---|---|---|---|---|
| | WIDE | TELE | WIDE | TELE |
| Zr | 1.0 | 1.25 | 1.0 | 1.25 |
| f' | 10.00 | 12.50 | | |
| Bf | 33.50 | 33.50 | | |
| FNo. | 1.92 | 2.08 | 1.92 | 2.08 |
| 2ω [°] | 102.6 | 89.6 | 101.8 | 88.8 |
| DD[6] | 20.11 | 20.11 | 18.59 | 18.59 |
| DD[11] | 14.23 | 6.19 | 14.81 | 6.77 |
| DD[13] | 19.55 | 26.12 | 19.55 | 26.12 |
| DD[17] | 19.85 | 2.43 | 19.85 | 2.43 |
| DD[19] | 8.13 | 19.11 | 8.13 | 19.11 |
| DD[29] | 0.30 | 8.22 | 0.30 | 8.22 |

The upper half of Table 25 shows values corresponding to Conditional Formulae (1) through (7) for Examples 1 through 8 above. The lower half of Table 25 shows the focal lengths of each of the first lens group G1 through the sixth lens group, denoted as f1 through f6. The values shown in Table 25 and Table 26 are related to the d line.

TABLE 25

| Formula | | Example 1 | Example 2 | Example 3 | Example 4 | Example 5 | Example 6 | Example 7 | Example 8 |
|---|---|---|---|---|---|---|---|---|---|
| (1) | fw/f12w | 0.007 | 0.029 | 0.048 | 0.066 | 0.061 | 0.079 | 0.084 | −0.007 |
| (2) | fw/f3 | −0.005 | −0.011 | 0.003 | −0.003 | −0.007 | −0.010 | −0.010 | −0.004 |
| (3) | fw/f5 | 0.076 | 0.076 | 0.060 | 0.063 | 0.058 | 0.053 | 0.053 | 0.078 |
| (4) | G5Nvd | 44.69 | 44.69 | 43.24 | 44.32 | 44.32 | 44.32 | 44.32 | 44.69 |
| (5) | G5Pvd | 81.54 | 81.54 | 81.54 | 81.54 | 81.54 | 81.54 | 81.54 | 81.54 |
| (6) | fw/f1 | −0.765 | −0.744 | −0.728 | −0.714 | −0.716 | −0.693 | −0.687 | −0.766 |
| (7) | G2vd | 46.58 | 46.58 | 46.58 | 46.58 | 46.58 | 46.58 | 46.58 | 46.58 |

| | Example 1 | Example 2 | Example 3 | Example 4 | Example 5 | Example 6 | Example 7 | Example 8 |
|---|---|---|---|---|---|---|---|---|
| f1 | −84.415 | −56.335 | −80.645 | −44.944 | −41.416 | −41.778 | −41.125 | −13.230 |
| f2 | 59.803 | 55.801 | 64.923 | 63.106 | 62.698 | 62.942 | 63.250 | 60.052 |
| f3 | −1971.247 | −911.678 | 3490.496 | −3371.060 | −1482.853 | −970.880 | −1017.570 | −2479.590 |
| f4 | 76.471 | 76.326 | 84.130 | 98.027 | 92.429 | 92.536 | 93.659 | 77.748 |
| f5 | 131.702 | 132.375 | 166.230 | 158.630 | 171.608 | 188.185 | 188.156 | 128.165 |
| f6 | 89.768 | 82.494 | 88.044 | 79.875 | 77.132 | 75.100 | 75.237 | 90.178 |

As can be understood from the data above, the projection zoom lenses of Examples 1 through 8 realize a widening of the angle of view with a full angle of view within a range from 100° to 110° at the wide angle end, have a sufficiently long back focus such that prisms, etc. can be inserted, are configured such that the reduction sides thereof are telecentric, favorably correct various aberrations, and realize high optical performance.

Figure 17:
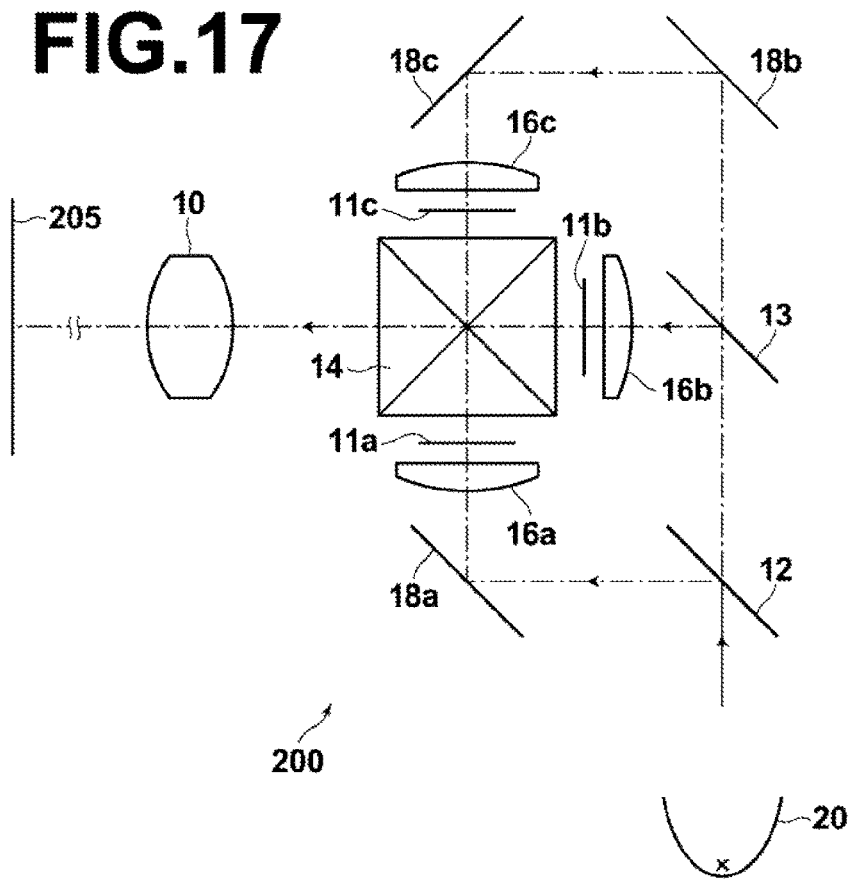
FIG. 17 is a diagram that illustrates the schematic configuration of a projection type display device according to an embodiment of the present disclosure.

Next, an embodiment of a projection display device of the present disclosure will be described with reference to FIG. 17. FIG. 17 is a diagram that illustrates the schematic configuration of a projection type display device according to an embodiment of the present disclosure. The projection type display device 200 illustrated in FIG. 17 is equipped with: a projection zoom lens 10 according to an embodiment of the present disclosure; a light source 20; transmissive display elements 11a through 11c that function as light valves each corresponding to a colored light beam; dichroic mirrors 12 and 13 for separating colors; a cross dichroic prism 14 for combining colors; condenser lenses 16a through 16c; and total reflection mirrors 18a through 18c for deflecting optical paths. Note that the projection zoom lens 10 is schematically illustrated in FIG. 17. In addition, although not illustrated in FIG. 17, an integrator is provided between the light source 20 and the dichroic mirror 12.

White light output by the light source 20 is separated into three colored light beams (G light, B light, and R light) by the dichroic mirrors 12 and 13. The colored light beams enters the transmissive display elements 11a through 11c corresponding thereto via the condenser lenses 16a through 16c and are optically modulated. After the colors are combined by the cross dichroic prism 14, the combined light beam enters the projection zoom lens 10. The projection zoom lens 10 projects an optical image formed by light which has been optically modulated by the transmissive display elements 11a through 11c onto a screen 205.

Embodiments and Examples of the present disclosure have been described above. However, the projection zoom lens of the present disclosure is not limited to the Examples described above, and various modifications to the aspects of the projection zoom lens are possible. For example, the radii of curvature, the distances among surfaces, the refractive indices, the Abbe's numbers, and the aspherical surface coefficients of the lenses may be changed as appropriate.

In addition, the projection type display device of the present disclosure is not limited to that having the configuration described above. For example, the light valves to be employed and the optical members to be employed to separate or combine light beams are not limited to the configurations described above, and various changes to these aspects are possible.

What is claimed is:
1. A projection zoom lens consisting of, in order from the magnification side to the reduction side:
 a first lens group having a negative refractive power;
 a second lens group having a positive refractive power;
 a third lens group;
 a fourth lens group having a positive refractive power;
 a fifth lens group; and
 a sixth lens group having a positive refractive power;
 the distances among all adjacent lens groups changing when changing magnification;
 the distance between the first lens group and the second lens group being shorter at the telephoto end than at the wide angle end;
 the distance between the second lens group and the third lens group being longer at the telephoto end than at the wide angle end;
 the distance between the third lens group and the fourth lens group being shorter at the telephoto end than at the wide angle end;
 the distance between the fourth lens group and the fifth lens group being longer at the telephoto end than at the wide angle end;
 the distance between the fifth lens group and the sixth lens group being longer at the telephoto end than at the wide angle end;
 a lens having a concave surface toward the magnification side in the paraxial region and a negative refractive power in the paraxial region being provided most toward the magnification side in the first lens group; and
 the fifth lens group having at least one negative lens, wherein:
 the first lens group consists of, in order from the magnification side to the reduction side, a negative lens having a concave surface toward the magnification side, a lens having a convex surface toward the mag- nification side, a negative lens having a concave surface toward the reduction side, a biconcave lens, and a cemented lens formed by cementing a positive lens and a negative lens together.

2. A projection zoom lens consisting of, in order from the magnification side to the reduction side:
a first lens group having a negative refractive power;
a second lens group having a positive refractive power;
a third lens group;
a fourth lens group having a positive refractive power;
a fifth lens group; and
a sixth lens group having a positive refractive power;
the distances among all adjacent lens groups changing when changing magnification;
the distance between the first lens group and the second lens group being shorter at the telephoto end than at the wide angle end;
the distance between the second lens group and the third lens group being longer at the telephoto end than at the wide angle end;
the distance between the third lens group and the fourth lens group being shorter at the telephoto end than at the wide angle end;
the distance between the fourth lens group and the fifth lens group being longer at the telephoto end than at the wide angle end;
the distance between the fifth lens group and the sixth lens group being longer at the telephoto end than at the wide angle end;
a lens having a negative refractive power in the paraxial region being provided most toward the magnification side in the first lens group;
the first lens group having at least one positive lens; and
the fifth lens group having at least one negative lens, wherein:
the first lens group consists of, in order from the magnification side to the reduction side, a negative lens having a concave surface toward the magnification side, a lens having a convex surface toward the magnification side, a negative lens having a concave surface toward the reduction side, a biconcave lens, and a cemented lens formed by cementing a positive lens and a negative lens together.

3. A projection zoom lens as defined in claim 1, in which Conditional Formula (1) below is satisfied:

$$-0.2 < fw/f12w < 0.3 \quad (1)$$

wherein fw is the focal length of the entire projection zoom lens at the wide angle end, and f12w is the combined focal length of the first lens group and the second lens group at the wide angle end.

4. A projection zoom lens as defined in claim 1, in which Conditional Formula (2) below is satisfied:

$$-0.2 < fw/f3 < 0.2 \quad (2)$$

wherein fw is the focal length of the entire projection zoom lens at the wide angle end, and f3 is the focal length of the third lens group.

5. A projection zoom lens as defined in claim 1, in which Conditional Formula (3) below is satisfied:

$$0 < fw/f5 < 0.2 \quad (3)$$

wherein fw is the focal length of the entire projection zoom lens at the wide angle end, and f5 is the focal length of the fifth lens group.

6. A projection zoom lens as defined in claim 1, in which Conditional Formula (4) below is satisfied:

$$35 < G5Nvd < 55 \quad (4)$$

wherein G5Nvd is the average Abbe's number of negative lenses that constitute the fifth lens group with respect to the d line.

7. A projection zoom lens as defined in claim 1, in which the fifth lens group has at least one positive lens, and Conditional Formula (5) below is satisfied:

$$62 < G5Pvd \quad (5)$$

wherein G5Pvd is the average Abbe's number of positive lenses that constitute the fifth lens group with respect to the d line.

8. A projection zoom lens as defined in claim 1, in which Conditional Formula (6) below is satisfied:

$$-1.2 < fw/f1 < -0.3 \quad (6)$$

wherein fw is the focal length of the entire projection zoom lens at the wide angle end, and f1 is the focal length of the first lens group.

9. A projection zoom lens as defined in claim 1, wherein:
the lens surface most toward the magnification side within the first lens group is of an aspherical shape having a concave surface toward the magnification side in the paraxial region, a region at which the negative refractive power becomes weaker than that in the paraxial region toward the exterior of the paraxial region in the radial direction, and an inflection point within the effective diameter thereof.

10. A projection zoom lens as defined in claim 1, in which the second lens group consists of only a single biconvex lens, and Conditional Formula (7) below to be satisfied:

$$40 < G2vd < 50 \quad (7)$$

wherein G2vd is the Abbe's number of the biconvex lens that constitutes the second lens group with respect to the d line.

11. A projection zoom lens as defined in claim 1, wherein:
the third lens group consists of, in order from the magnification side to the reduction side, a positive lens having a convex surface toward the magnification side and a negative lens having a concave surface toward the magnification side.

12. A projection zoom lens as defined in claim 2, in which Conditional Formula (1) below is satisfied:

$$-0.2 < fw/f12w < 0.3 \quad (1)$$

wherein fw is the focal length of the entire projection zoom lens at the wide angle end, and f12w is the combined focal length of the first lens group and the second lens group at the wide angle end.

13. A projection zoom lens as defined in claim 2, in which Conditional Formula (2) below is satisfied:

$$-0.2 < fw/f3 < 0.2 \quad (2)$$

wherein fw is the focal length of the entire projection zoom lens at the wide angle end, and f3 is the focal length of the third lens group.

14. A projection zoom lens as defined in claim 2, in which Conditional Formula (3) below is satisfied:

$$0 < fw/f5 < 0.2 \quad (3)$$

wherein fw is the focal length of the entire projection zoom lens at the wide angle end, and f5 is the focal length of the fifth lens group.

15. A projection zoom lens as defined in claim 2, in which Conditional Formula (4) below is satisfied:

$$35 < G5Nvd < 55 \quad (4)$$

wherein G5Nvd is the average Abbe's number of negative lenses that constitute the fifth lens group with respect to the d line.

16. A projection zoom lens as defined in claim 2, in which the fifth lens group has at least one positive lens, and Conditional Formula (5) below is satisfied:

$$62 < G5Pvd \quad (5)$$

wherein G5Pvd is the average Abbe's number of positive lenses that constitute the fifth lens group with respect to the d line.

17. A projection zoom lens as defined in claim 2, in which Conditional Formula (6) below is satisfied:

$$-1.2 < fw/f1 < -0.3 \quad (6)$$

wherein fw is the focal length of the entire projection zoom lens at the wide angle end, and f1 is the focal length of the first lens group.

18. A projection type display device, comprising:
a light source;
a light valve into which light from the light source enters; and
a projection zoom lens as defined in claim 1 as a projection zoom lens that projects an optical image formed by light modulated by the light valve onto a screen.

19. A projection type display device, comprising:
a light source;
a light valve into which light from the light source enters; and
a projection zoom lens as defined in claim 2 as a projection zoom lens that projects an optical image formed by light modulated by the light valve onto a screen.

* * * * *